US012252357B1

(12) United States Patent
Yohe et al.

(10) Patent No.: US 12,252,357 B1
(45) Date of Patent: Mar. 18, 2025

(54) SYSTEMS, APPARATUS AND METHODS FOR SORTING DUNNAGE

(71) Applicant: DYCO, INC., Bloomsburg, PA (US)

(72) Inventors: Peter D. Yohe, Bloomsburg, PA (US); Benjamin M. Kuznicki, Bloomsburg, PA (US); Travis J. Potter, Berwick, PA (US); Michael J. Perron, Mifflinburg, PA (US); Joshua J. Gordon, Unityville, PA (US)

(73) Assignee: DYCO, Inc., Bloomsburg, PA (US)

( * ) Notice: Subject to any disclaimer, the term of this patent is extended or adjusted under 35 U.S.C. 154(b) by 0 days.

(21) Appl. No.: 18/492,270

(22) Filed: Oct. 23, 2023

(51) Int. Cl.
*B65G 61/00* (2006.01)

(52) U.S. Cl.
CPC ...... *B65G 61/00* (2013.01); *B65G 2203/0208* (2013.01); *B65G 2203/041* (2013.01)

(58) Field of Classification Search
CPC ...... B65G 57/005; B65G 57/24; B65G 61/00; B65G 59/02; Y10S 414/106; B07C 5/36; B65H 2553/42
See application file for complete search history.

(56) References Cited

U.S. PATENT DOCUMENTS

| | | | | |
|---|---|---|---|---|
| 5,975,837 A * | 11/1999 | Focke | B65G 47/90 | 414/792.9 |
| 6,227,793 B1 * | 5/2001 | Knighten | B25J 15/0253 | 414/744.5 |
| 6,658,816 B1 * | 12/2003 | Parker | B65G 57/005 | 414/788.1 |
| 7,715,615 B2 * | 5/2010 | Van Nice | B65H 43/04 | 382/152 |
| 7,993,095 B2 * | 8/2011 | Reichler | B65G 57/24 | 414/789.5 |
| 8,167,530 B2 * | 5/2012 | Langlot | B65G 61/00 | 414/419 |
| 8,554,371 B2 * | 10/2013 | Parker | B65G 61/00 | 700/254 |
| 9,469,490 B2 * | 10/2016 | Yohe | B65G 47/912 | |
| 11,091,330 B2 * | 8/2021 | Yohe | B65G 59/026 | |
| 2021/0221628 A1 * | 7/2021 | Yohe | B65G 57/04 | |
| 2023/0321694 A1 * | 10/2023 | Hegde | B07C 5/28 | 209/577 |

FOREIGN PATENT DOCUMENTS

| | | | |
|---|---|---|---|
| DE | 20021874 U1 * | 7/2002 | B65G 57/24 |

* cited by examiner

*Primary Examiner* — Gregory W Adams
(74) *Attorney, Agent, or Firm* — McNees Wallace & Nurick

(57) ABSTRACT

A system for sorting dunnage of an article array having a programmable robot including an arm for transferring a dunnage from a stack of dunnage of different types to a collection area. The programmable robot includes a head having a first griper assembly for engaging with a first type of dunnage, a second clamping griper for engaging with a second type of dunnage; and a third gripper assembly for engaging with a third type of dunnage. The first griper assembly, the second griper assembly and the third gripper assembly are independently operated and configured to engage the respective dunnage based on the type of dunnage.

15 Claims, 39 Drawing Sheets

SYSTEMS, APPARATUS AND METHODS FOR SORTING DUNNAGE

TECHNICAL FIELD

The present disclosure relates to systems, apparatus and methods for sorting dunnage. More specifically, the present disclosure relates to systems, apparatus and methods for sorting dunnage based on a type or kind of dunnage.

BACKGROUND

In many instances, it may be desirable to transport large quantities of articles, such as empty bottles, to a location for filling. To reduce the amount of handling required and/or to reduce the amount of shipping material consumed, the articles may be arranged in a tight grouping, or array, of articles. Each empty article arrays are typically separated from each other by wrapping a plastic bag to form a loaded pallet and ready for shipment. The article arrays can also be arranged on (or overlay) a layer of articles, such as, a dunnage (e.g., slip sheets, top frames, pallets) having a footprint which can be accommodated by freight hauling compartments, e.g., for truck, rail, sea or air vessels. In most cases, the dunnage is an inexpensive or waste material used to load and secure the article arrays during transportation. In other terms, it refers to miscellaneous baggage, brought along during transport. In the context of depalletizing a loaded pallet, dunnage can refer to a layer that separates each article array, a top layer or top frame and/or a bottom pallet, each layer used to prevent the article arrays from being moved or damaged during shipment.

Once the articles are depalletized or unpackaged, the dunnage can be transported to a location to be stored, reused, or discarded, if damaged. One approach to handling dunnage requires personnel to manually remove the dunnage from the article arrays and transport the dunnage to be stored. However, this is inefficient and labor-intensive, as well as possibly injuring the personnel. Also, this approach can be potentially hazardous for the personnel, as access to the dunnage may require the personnel to handle dangerous tools and/or equipment. Additionally, there may be damage or breakage to the dunnage itself during the depalletizing process or transport, leading to costly replacement costs of damaged dunnage.

Further, while there are depalletizing systems that can remove dunnage from a loaded pallet, these systems are only a single-type system. That is, these depalletizing systems merely handles the dunnage and stacks them without determining the type or form of the dunnage. This creates additional time to determine and sort the various types of dunnage into an organized stacked manner, which can lead to the potential concerns as discussed above.

Accordingly, there is a need for improved apparatus and methods for sorting and storing dunnage that do not suffer from these shortcomings.

SUMMARY

In an exemplary embodiment, a system for sorting dunnage of an article array having a programmable robot includes an arm for transferring a dunnage from a plurality of dunnage being of different types to a collection area. The programmable robot includes a head having a first clamping assembly for engaging with a first type of dunnage, a second clamping assembly for engaging with a second type of dunnage; and a plurality of grippers for engaging with a third type of dunnage. The first clamping assembly, the second clamping assembly and the plurality of grippers are independently operated and configured to engage the respective dunnage based on the type of dunnage.

In a further exemplary embodiment, a system for sorting dunnage of an article array, includes a dunnage receiving table, a programmable robot including an arm for transferring a dunnage based on a type of dunnage, wherein, in response to a dunnage of a first type, the programmable robot transfers the dunnage of the first type to a first collection area, wherein, in response to a dunnage of a second type, the programmable robot transfers the dunnage of the second type to a second collection area, and wherein, in response to a dunnage of a third type, the programmable robot transfers the dunnage of the third type to the dunnage receiving table, a conveyor for transporting the dunnage of the third type to an inspection area, and an inspection device for inspecting the dunnage of the third type for damage.

In yet a further exemplary embodiment, a method of sorting dunnage of a depalletized loaded pallet, includes scanning, via a sensor, a topmost dunnage from a stack of dunnage, determining a type of dunnage, selectively operating a corresponding gripper assembly associated with the determined type of dunnage, and transporting the dunnage to a predetermined stacking area.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 8E-8G are views of an exemplary robot head engaging with a stack of dunnage, according to example embodiments of the present disclosure.

Figure 1:
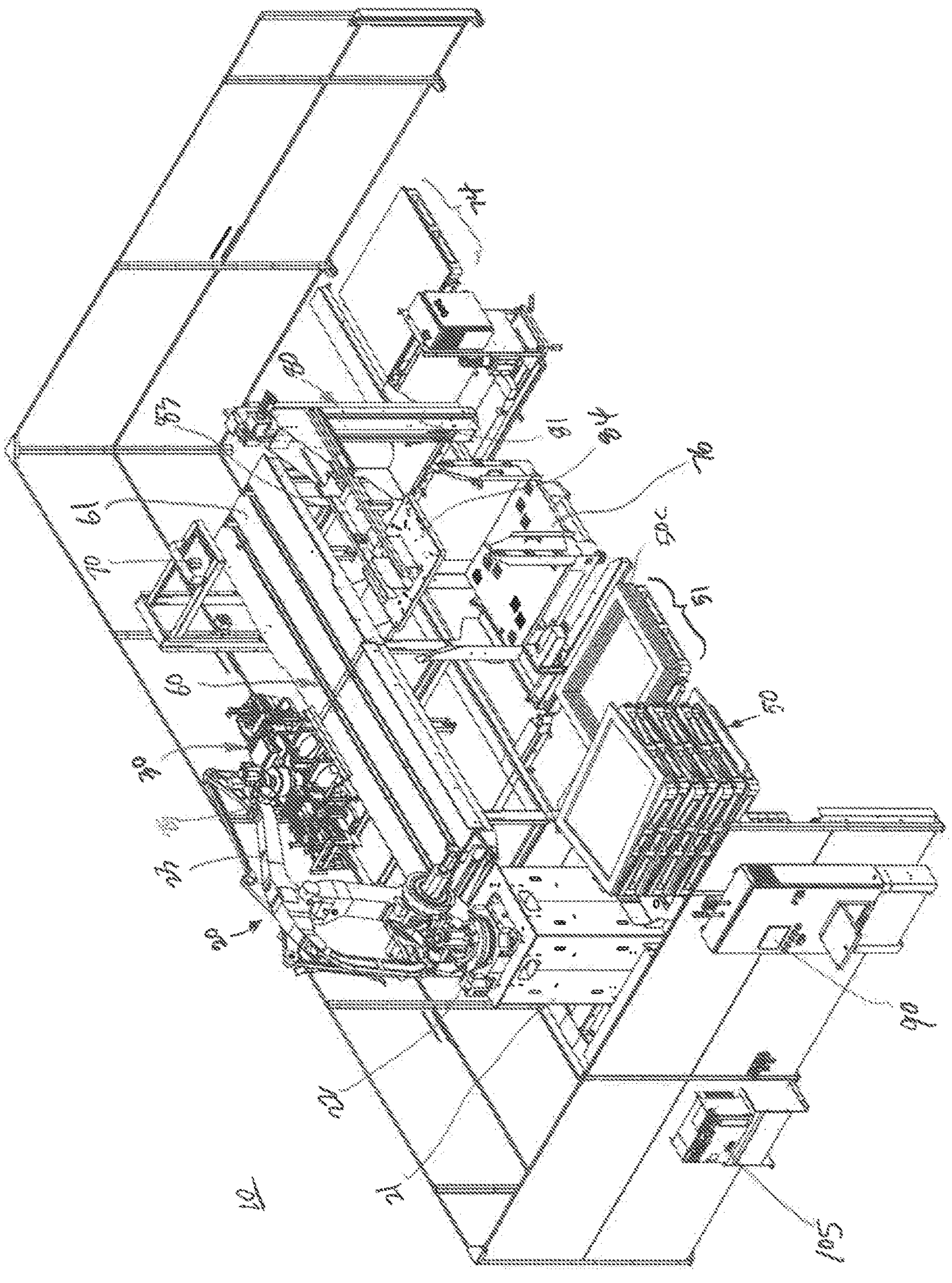
FIG. 1 is a perspective view of an exemplary dunnage sorting system, according to an example embodiment of the present disclosure.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

The present disclosure describes systems and methods for automatically sorting (i.e., arranging, grouping, organizing) dunnage from a depalletized loaded pallet based on a type of dunnage. This creates an efficient and time-saving process in organizing similar dunnage into respective individual orderly stack from a stack of different types of dunnage. There is also no need for an operator to handle and sort the dunnage from the stacked dunnage, unlike conventionally, tools and/or instruments were required or used, resulting in possible injuries to the operator and/or damage to the dunnage itself.

In one embodiment, a programmable robot is used to sort the different types of dunnage. The robot can be an industrial robot, such as an anthropomorphic robotic device, or other device capable of handling and transferring the dunnage to a stacking area. The robot includes a robot head that handles and transports the dunnage to its respective area. It is to be understood that the robot head can be dunnage specific, and easily and quickly operate various types of dunnage. As such, the present system requires only one robot head which can operate and transport different types of dunnage, e.g., slip sheets, top frames, pallets, etc. For example, after an initial scan of a topmost stacked dunnage by a sensor (via a controller) attached on the robot head, the robot transfers the dunnage to one of: a first collection stacking area of a first type of dunnage (e.g., top frames), a second collection stacking area of a second type of dunnage (e.g., pallets), or a third collection area of a third type of dunnage (e.g., slip sheets) for further inspection, which will be described later in detail.

For purposes herein, the term "dunnage" may refer to an article layer used to load and secure an article array during transportation. Such examples include slip sheets, top frames, pallet, and others. The terms "gripped," "transported," "moved," "engaged" and the like in the context of the interaction between a robot and a dunnage may be used interchangeably. Finally, the terms "translated" and "moved" and "pushed" and the like in the context of the movements of the dunnage may be used interchangeably.

Figure 2:
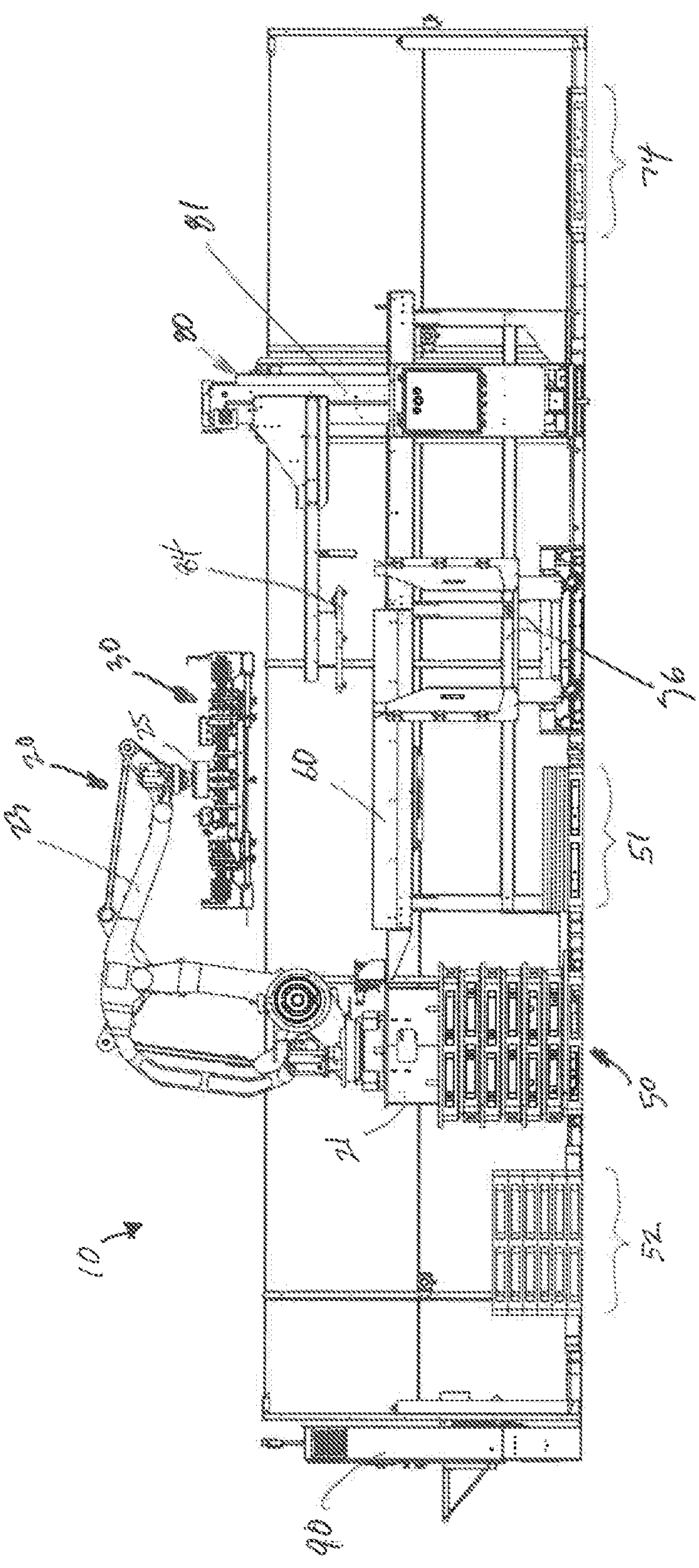
FIG. 2 is a side view of an exemplary dunnage sorting system of FIG. 1, according to an example embodiment of the present disclosure.
Figure 8A:
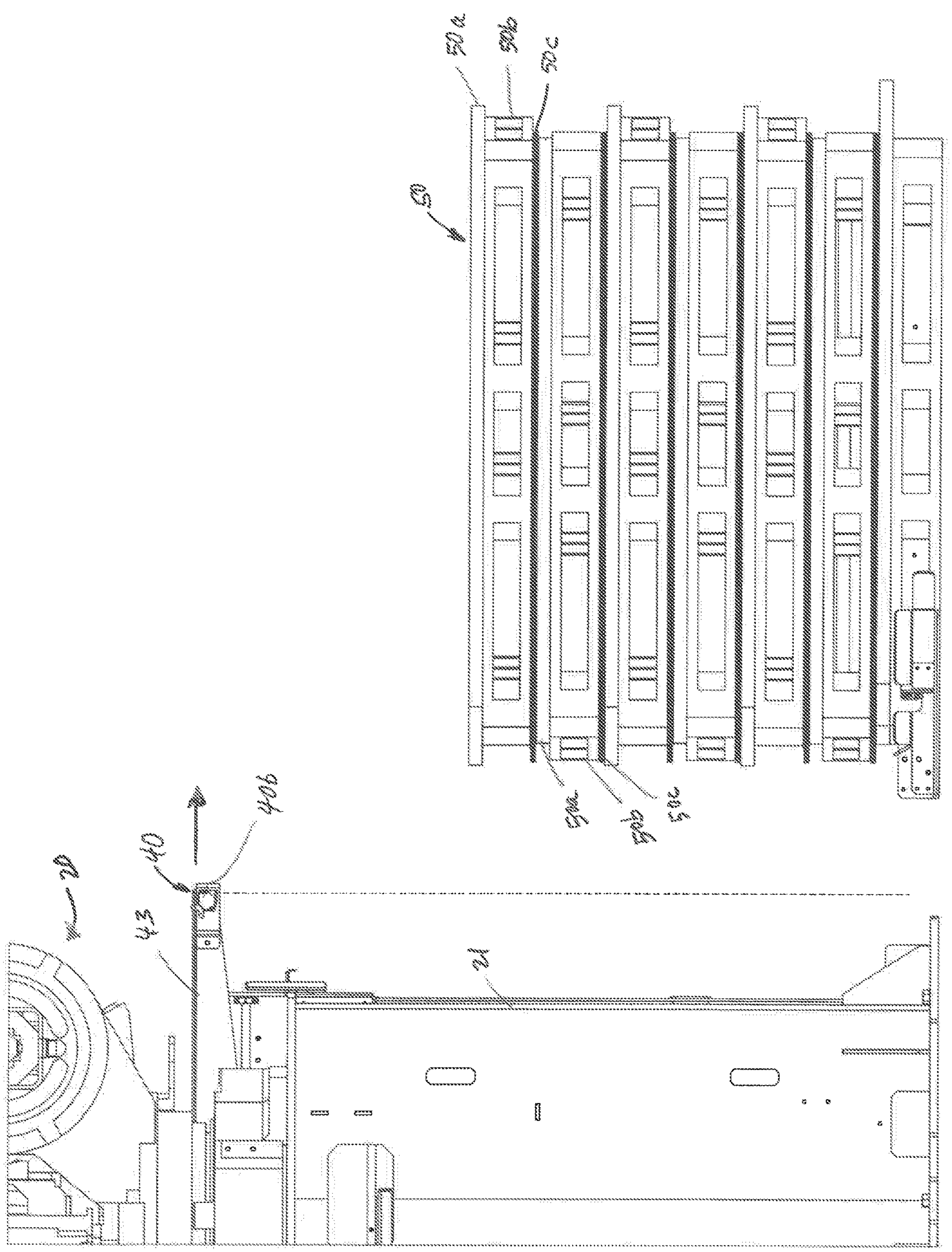
FIGS. 8A-8D are views of an exemplary robot head including a sensor detecting a topmost dunnage of a stack of dunnage, according to example embodiments of the present disclosure.
Figure 8B:
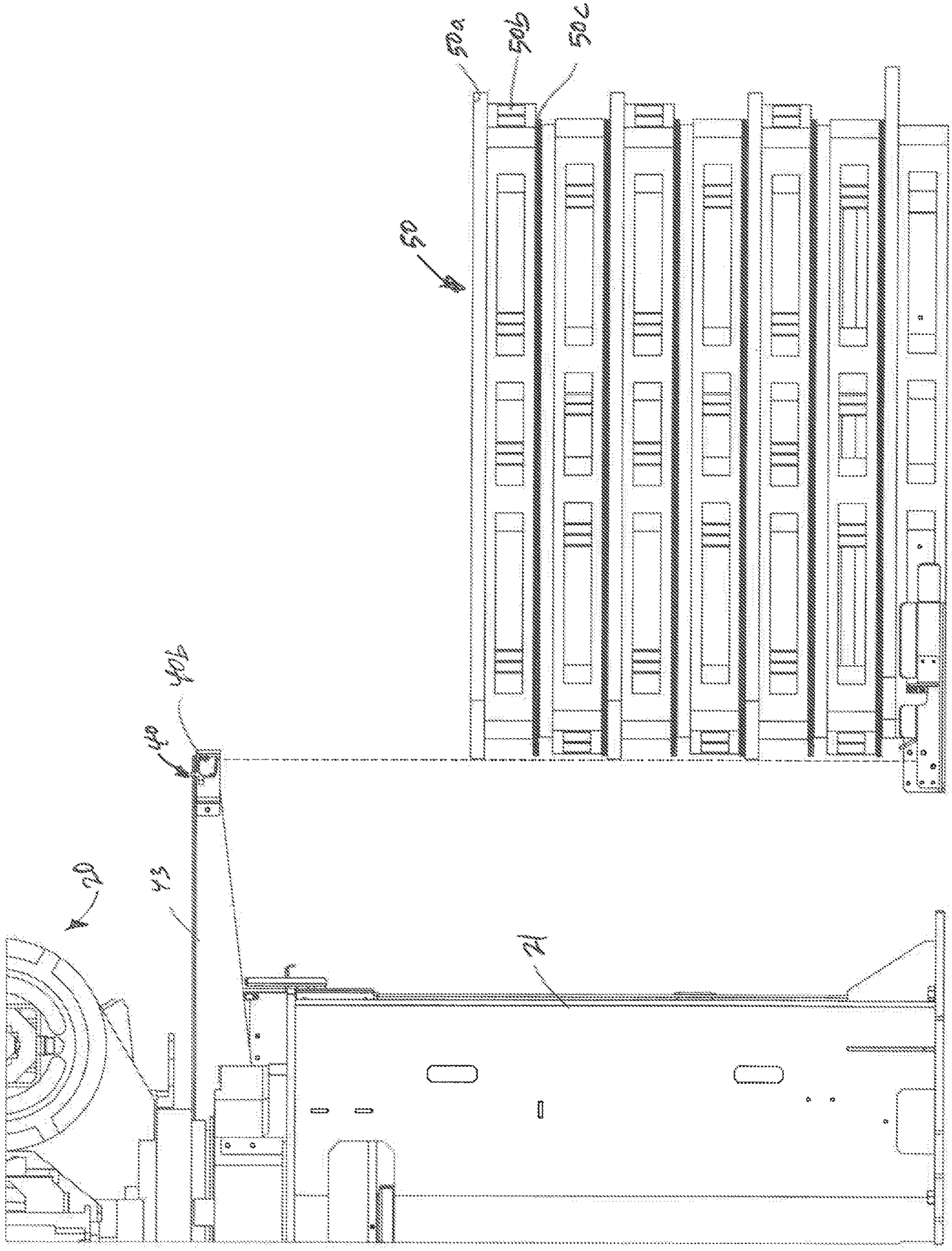
Figure 8C:
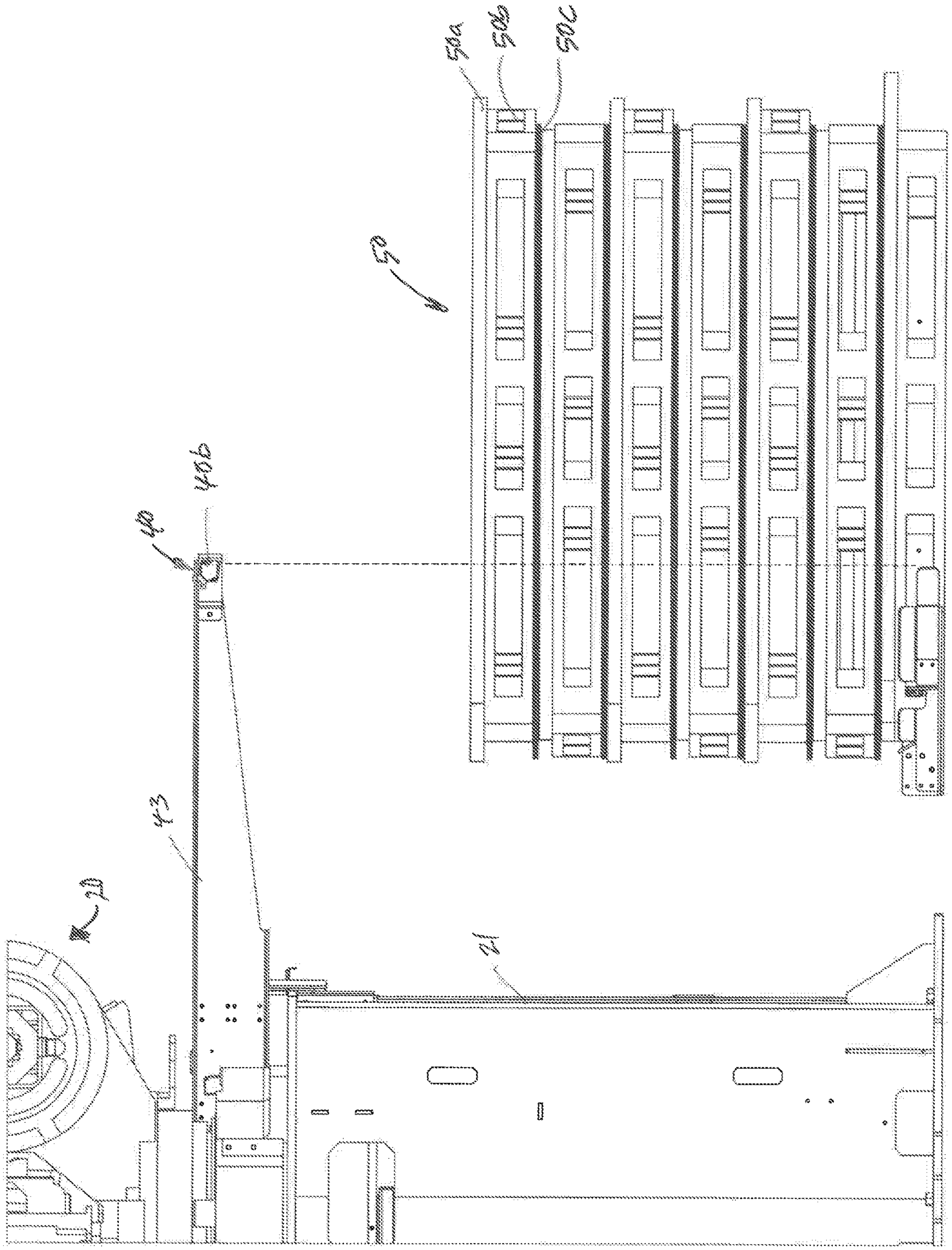
Figure 8D:
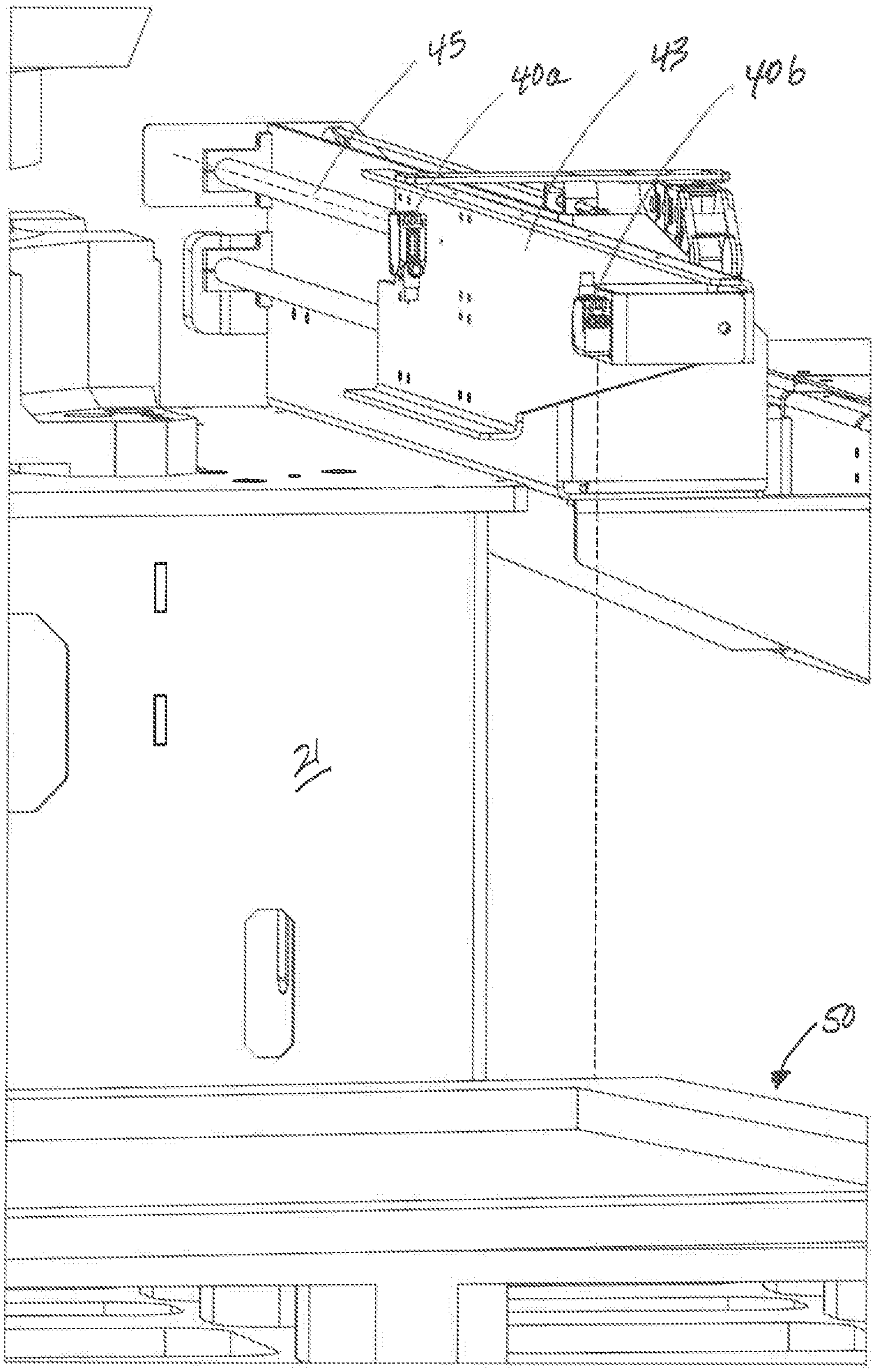

Referring to FIGS. 1 and 2, an automated system 10 and method for sorting (i.e., arranging, organizing, grouping) a dunnage 50 in a stacked arrangement is shown. In some implementations, the dunnage 50 can be for example, but not limited, to slip sheets, top frames, pallets, etc. used in shipping article arrays. As shown, the dunnage 50 is arranged in a stacked manner of various types of dunnage. That is, the stacked dunnage 50 can consist of slip sheets, top frames, and pallets in any order (random order of types of dunnage), as best shown in FIG. 8A. The system 10 includes a robot 20 configured to grab one of the dunnage from the stacked dunnage 50 and transport the grabbed dunnage to one of collection areas 51, 52 for collection or storage or to a conveyor table 60 to transport the dunnage 50 to an inspection area 61 for further inspection. More specifically, after a scan of a topmost stacked dunnage 50 by a sensor 40 (FIG. 8E) (via a controller 105), the robot 20 transfers the dunnage to the collection stacking area 51 based on a first type of dunnage (e.g., top frames), the collection stacking area 52 based on a second type of dunnage (e.g., pallets), or the conveyor table 60 based on a third type of dunnage (e.g., slip sheets) for further inspection, which will be described later in detail.

The robot 20 is mounted on a rotary axis 22 (attached to a base 21) that is configured to rotate 360 degrees about its axis. As such, the robot 20 is a multi-axis robot having five axes of motion. The robot 20 includes a cantilevered arm 23 extending from the rotary axis 22 and supporting a robot head 30. At a distal end of arm 23, the robot head 30 is attached to a rotary axis 25 (FIG. 4) rotating 360 degrees about its axis, driven by a motor 27, e.g., AC motor, DC motor, or servo motor. This permits the robot head 30 to correspondingly rotate 360 degrees.

Figure 3:
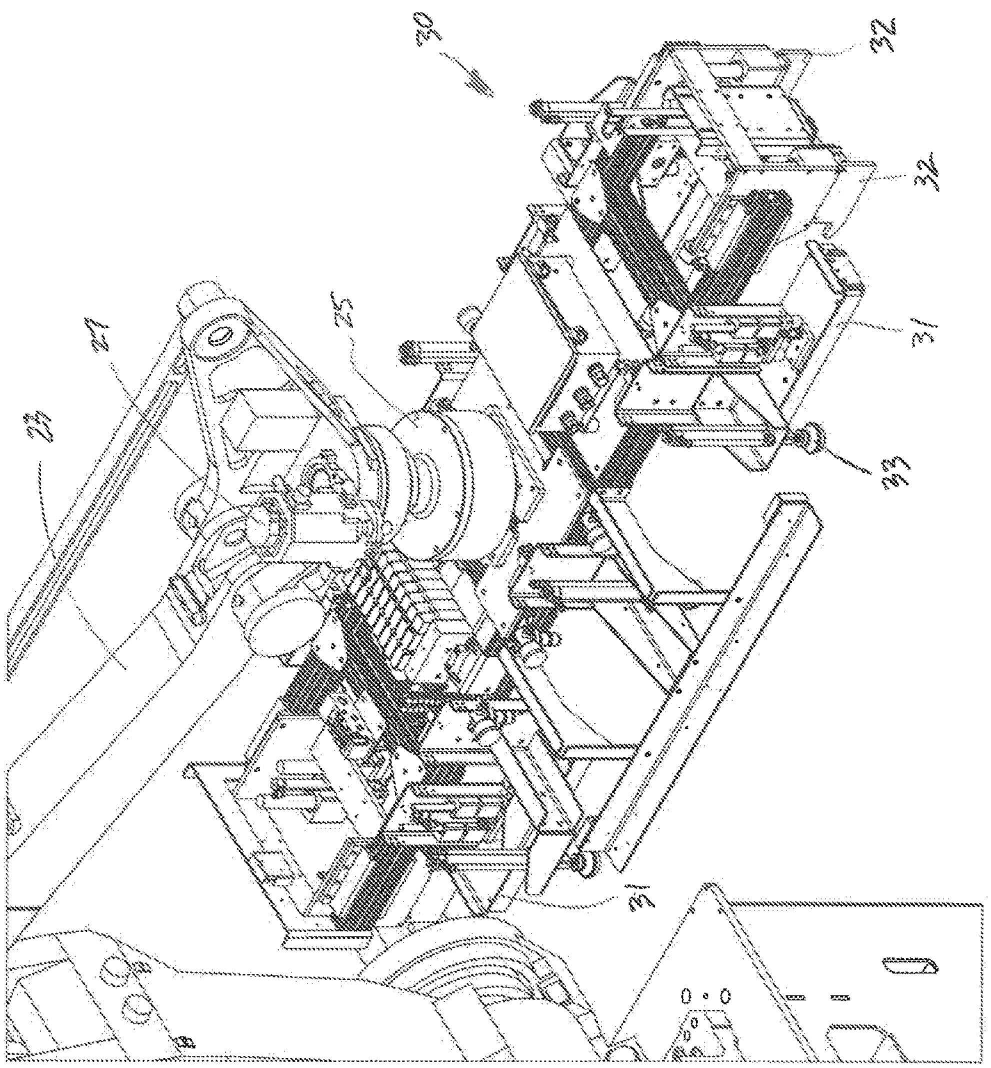
FIG. 3 is a perspective upper view of an exemplary robot head, according to an example embodiment of the present disclosure.
Figure 4:
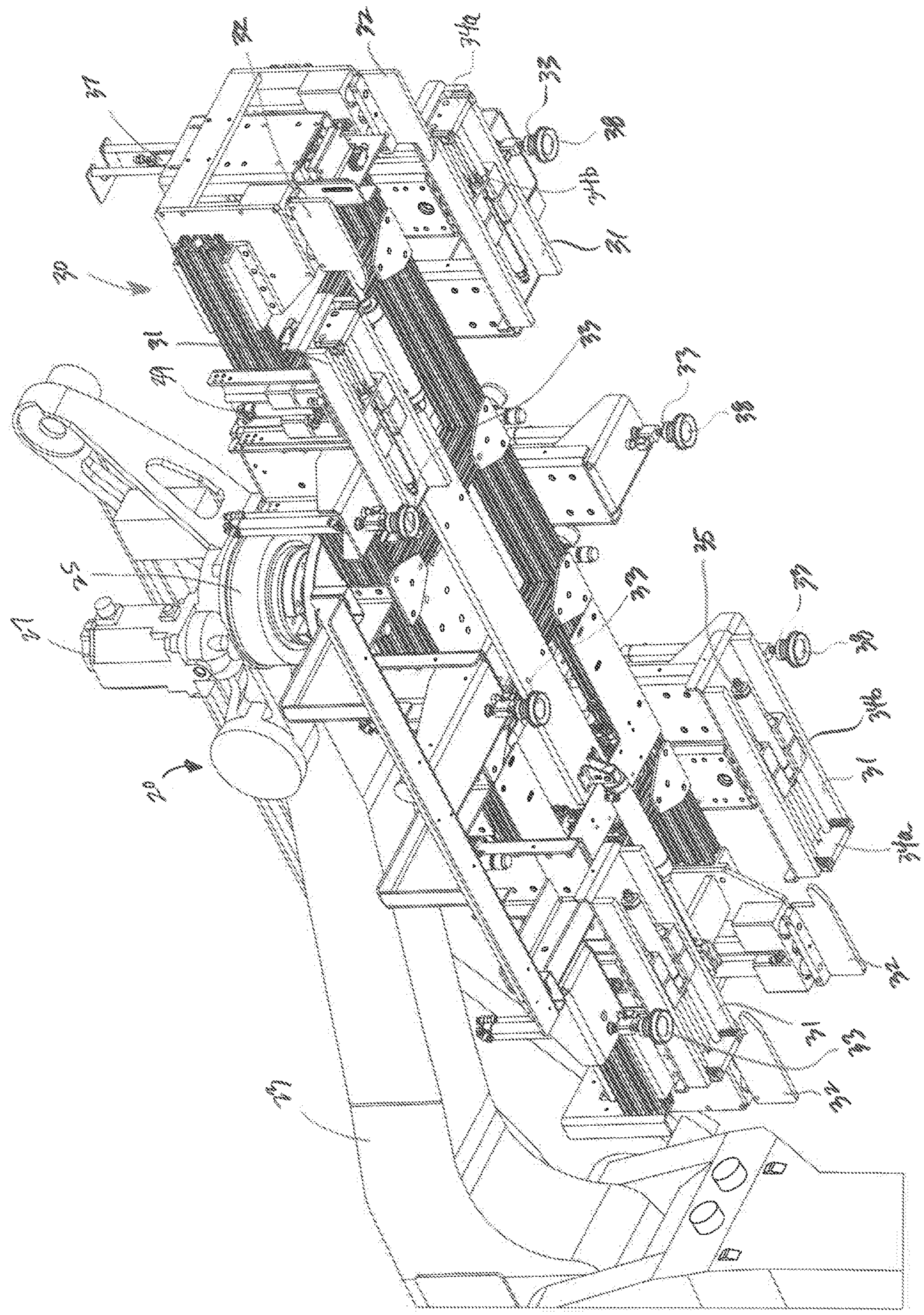
FIG. 4 is a perspective lower view of an exemplary robot head, according to an example embodiment of the present disclosure.

Referring to FIGS. 3 and 4, the robot head 30 includes a plurality of grippers 31, 32, 33 of varying types and functions to selectively engage dunnage 50. For example, grippers 31 are configured to engage with a top frame 50*a*, grippers 32 are configured to engage with a pallet 50*b*, and grippers 33 are configured to engage with a slip sheet 50*c*. This provides a single robot head that is multi-functional requiring no inter-changeable parts replacement and has a smaller footprint space, which is crucial in manufacturing facilities.

Figure 5A:
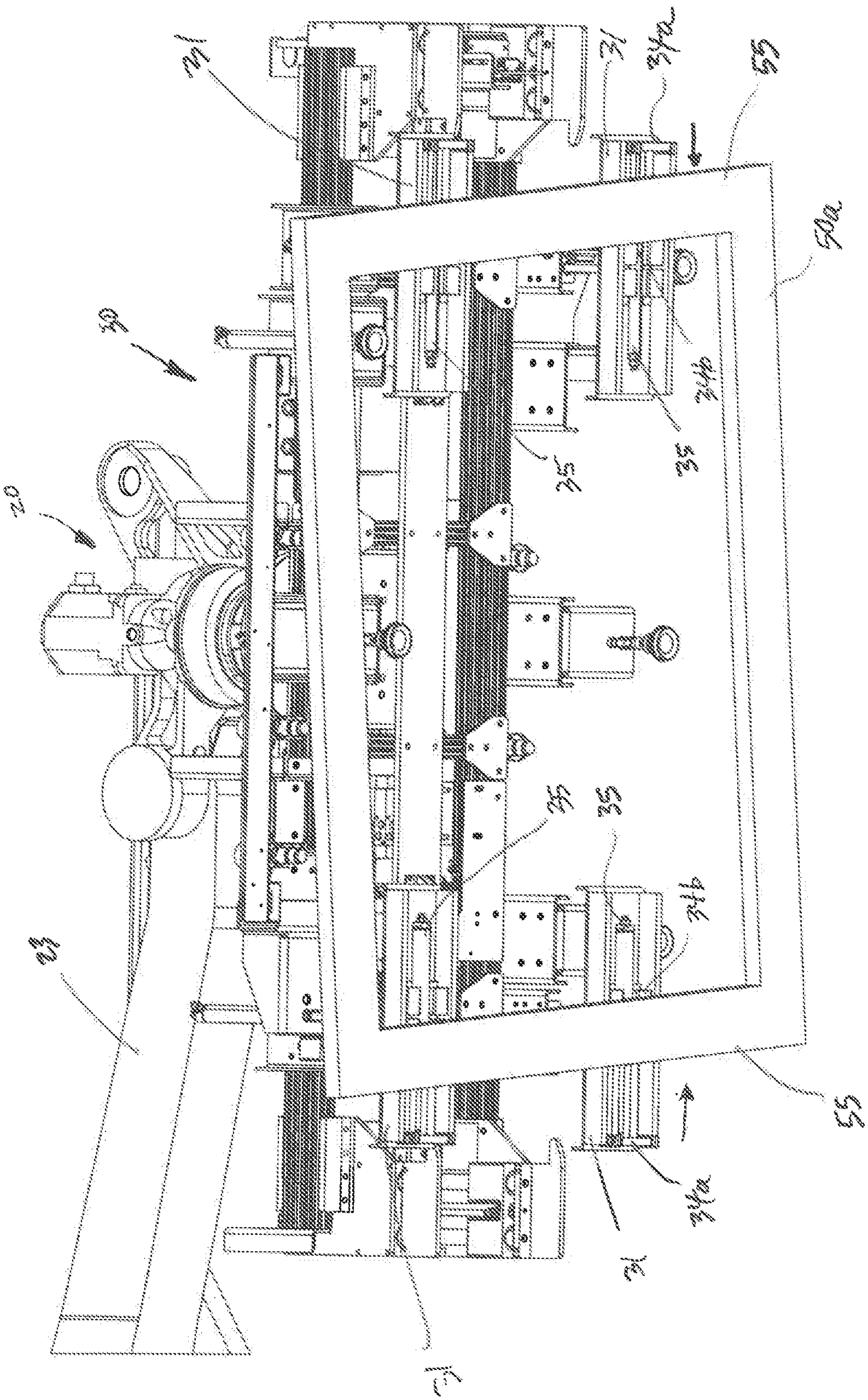
FIGS. 5A-5C are perspective lower views of an exemplary robot head engaging with a top frame, according to example embodiments of the present disclosure.
Figure 5B:
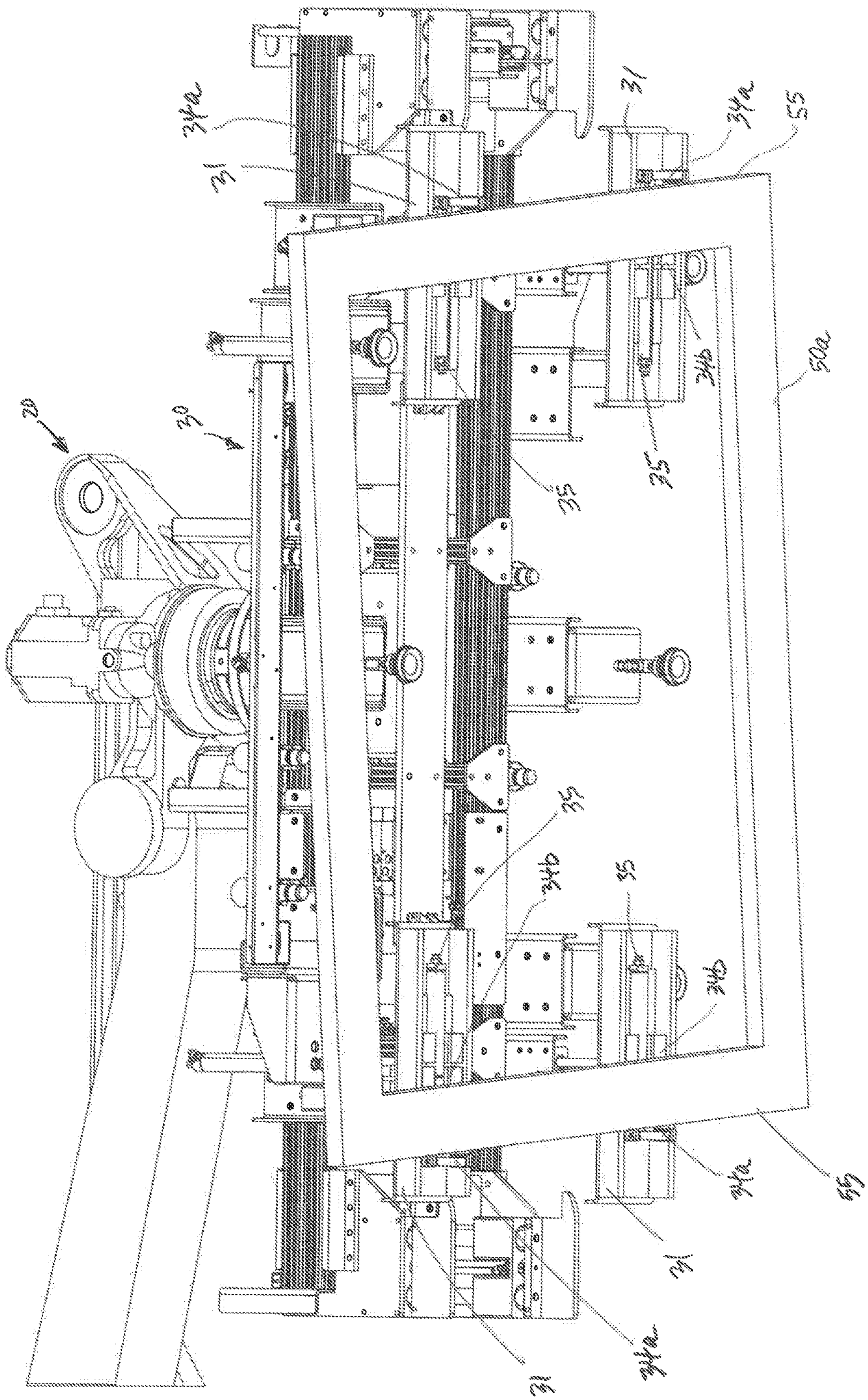
Figure 5C:
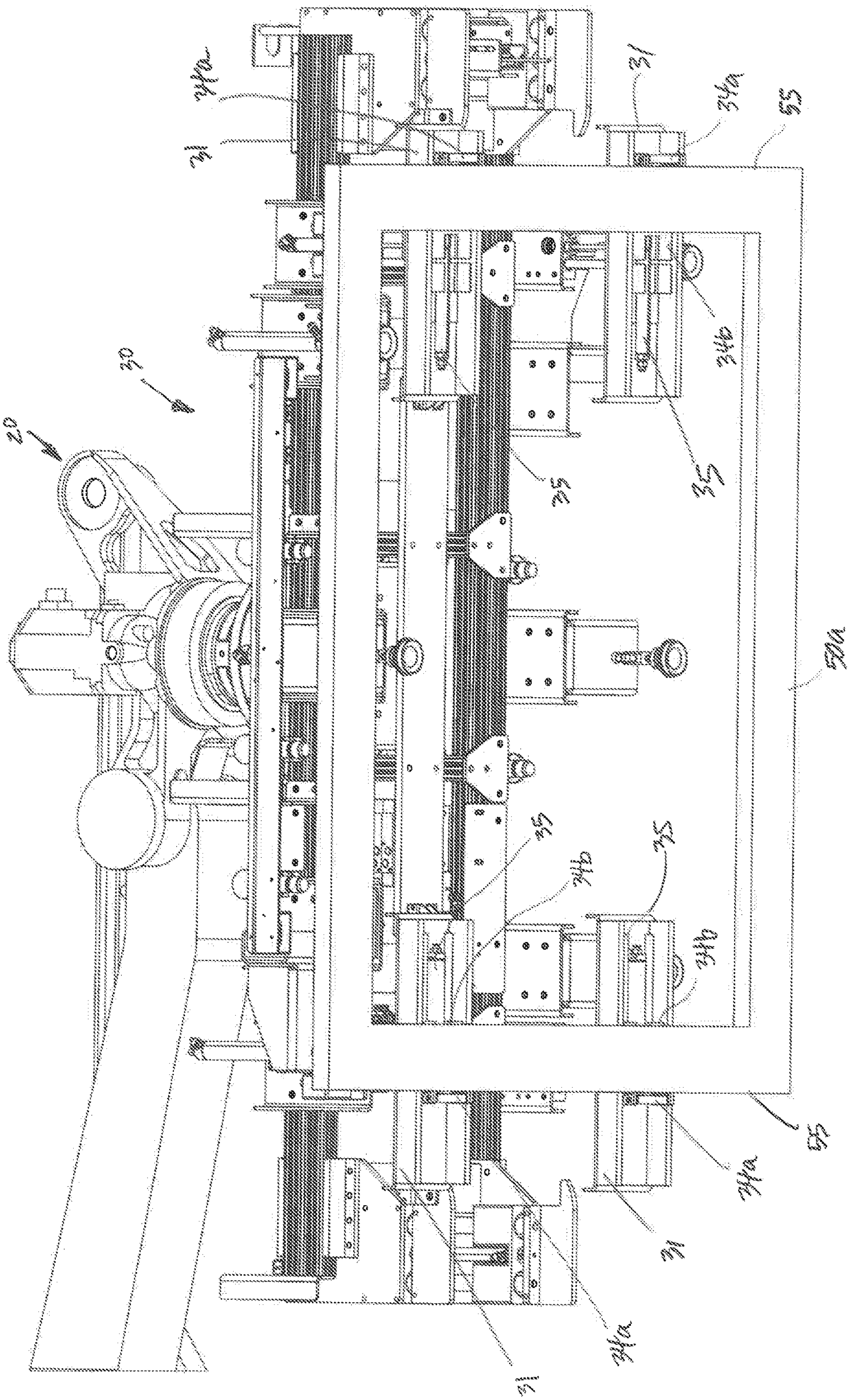

Referring to FIGS. 5A-5C, the robot head 30 includes a plurality of pairs of grippers 31 for selectively manipulating dunnage 50 (i.e., top frames 50*a*). In one implementation, the robot head 30 contains two pairs of grippers 31 that are configured to engage a top frame 50*a*. The two pairs of grippers 31 are separated from each other sufficient to engage the top frame 50*a*. For example, the two pairs of grippers 31 are spaced apart to engage a standard-sized top frame of 48×40 inches. Even further, each pair of grippers 31 is configured to manipulate a short side portion 55 of the top frame 50*a* of approximately 4-6 inches width thereof. Each pair of grippers 31 includes a jaw 34*a* and a corresponding jaw 34*b* relative to each other between a first position (FIG. 5C) for gripping the short side portion 55 the top frame 50*a* and a second position (FIG. 5A) associated with the release of the top frame 50*a*. In one implementation, jaw 34*a* is moveable or selectively moveable towards jaw 34*b* when attempting to grip the short side portion 55 of top frame 50*a*. In another implementation, jaw 34*a* is moveable or selectively moveable away from jaw 34*b* when attempting to release the short side portion 55 of top frame 50*a*. In some implementations, jaws 34*a*, 34*b* are driven by an actuator 35, such as a pneumatic actuator connected to a pressurized air source (not shown) attached to each jaw 34*a*, 34*b*.

While the exemplary embodiments illustrated herein describe two pairs of grippers, it should be noted that this is not limited by herein and other numbers of grippers may be employed.

Figure 6A:
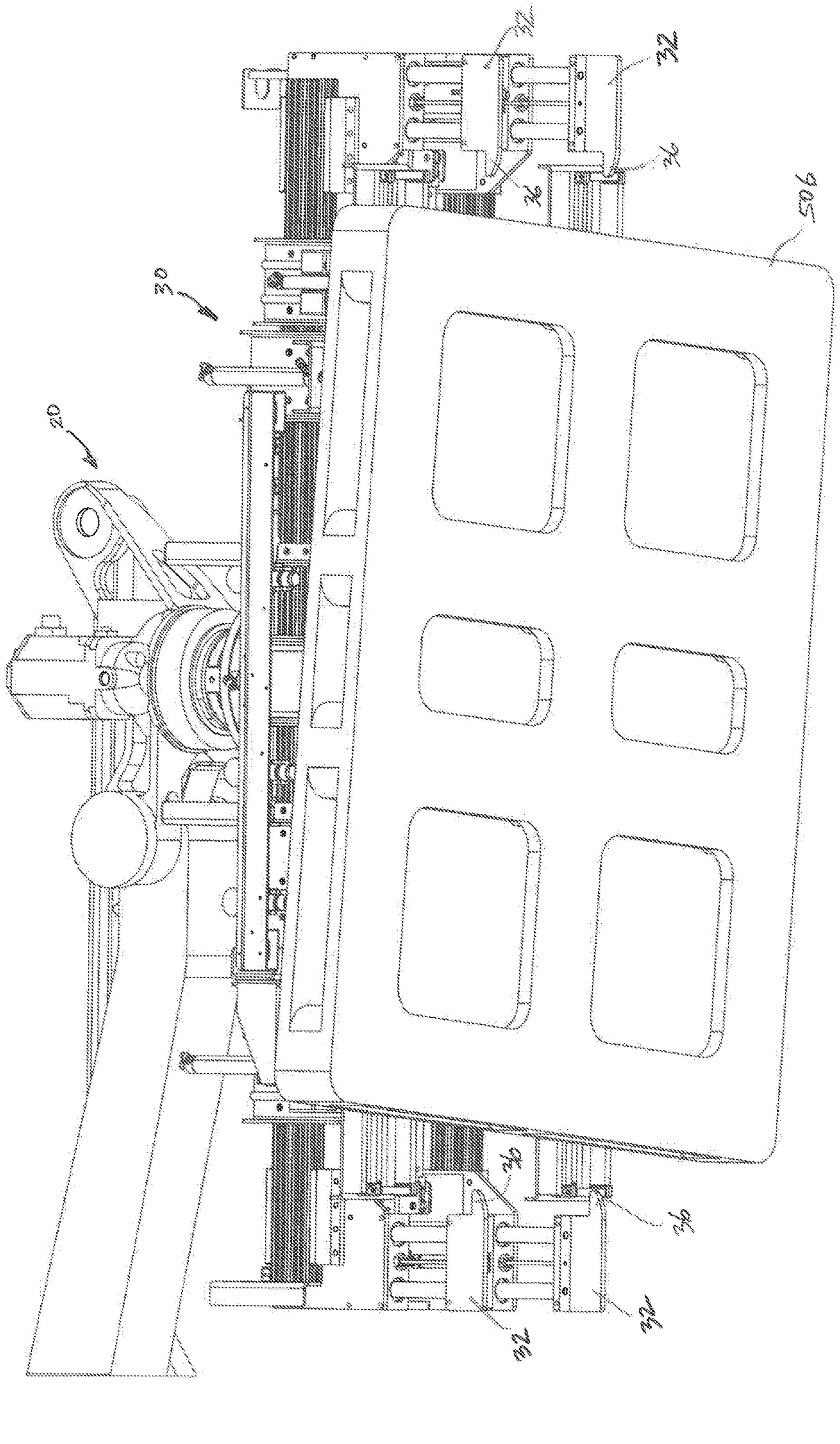
FIGS. 6A-6D are views of an exemplary robot head engaging with a pallet, according to example embodiments of the present disclosure.
Figure 6B:
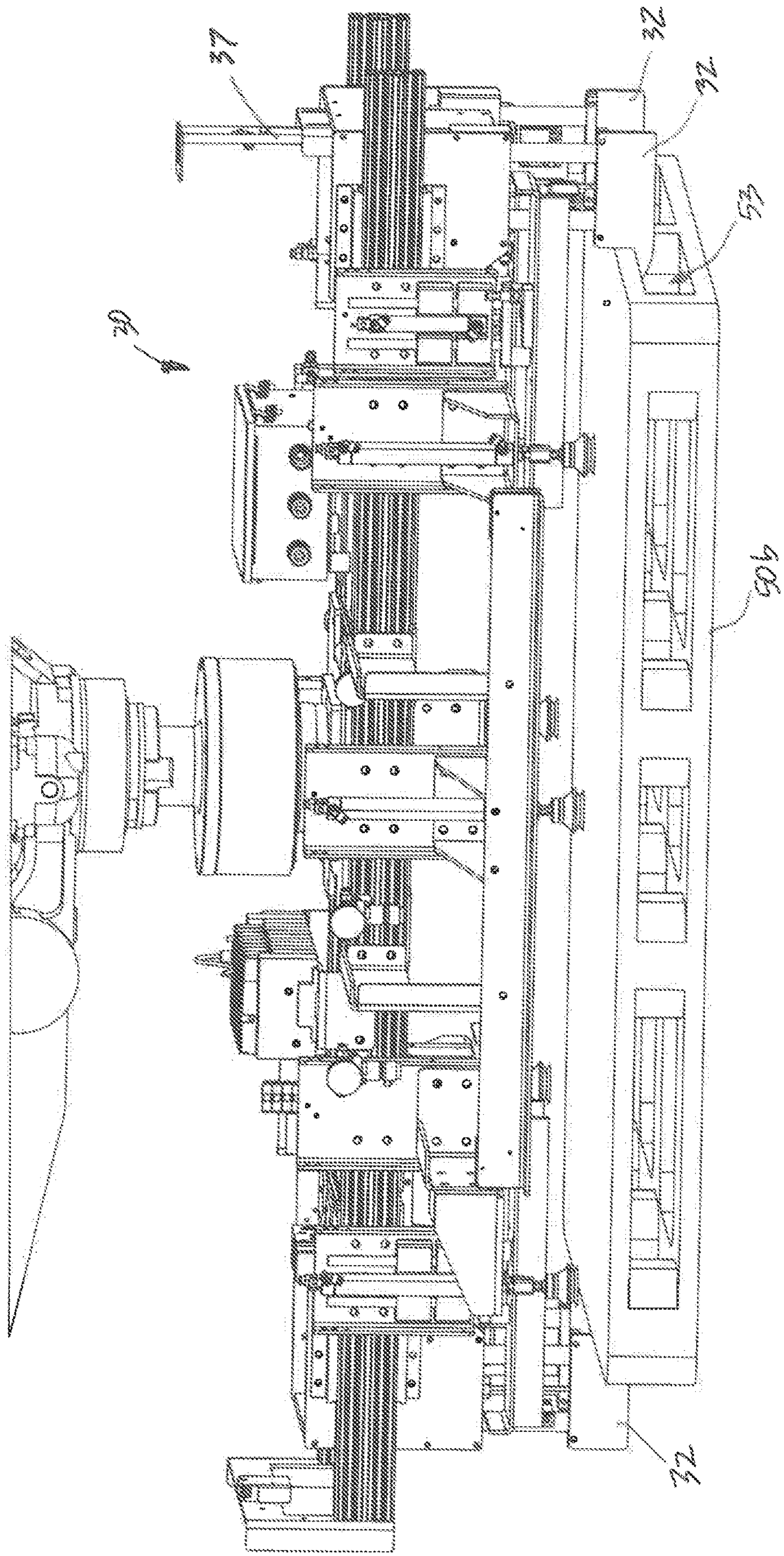
Figure 6C:
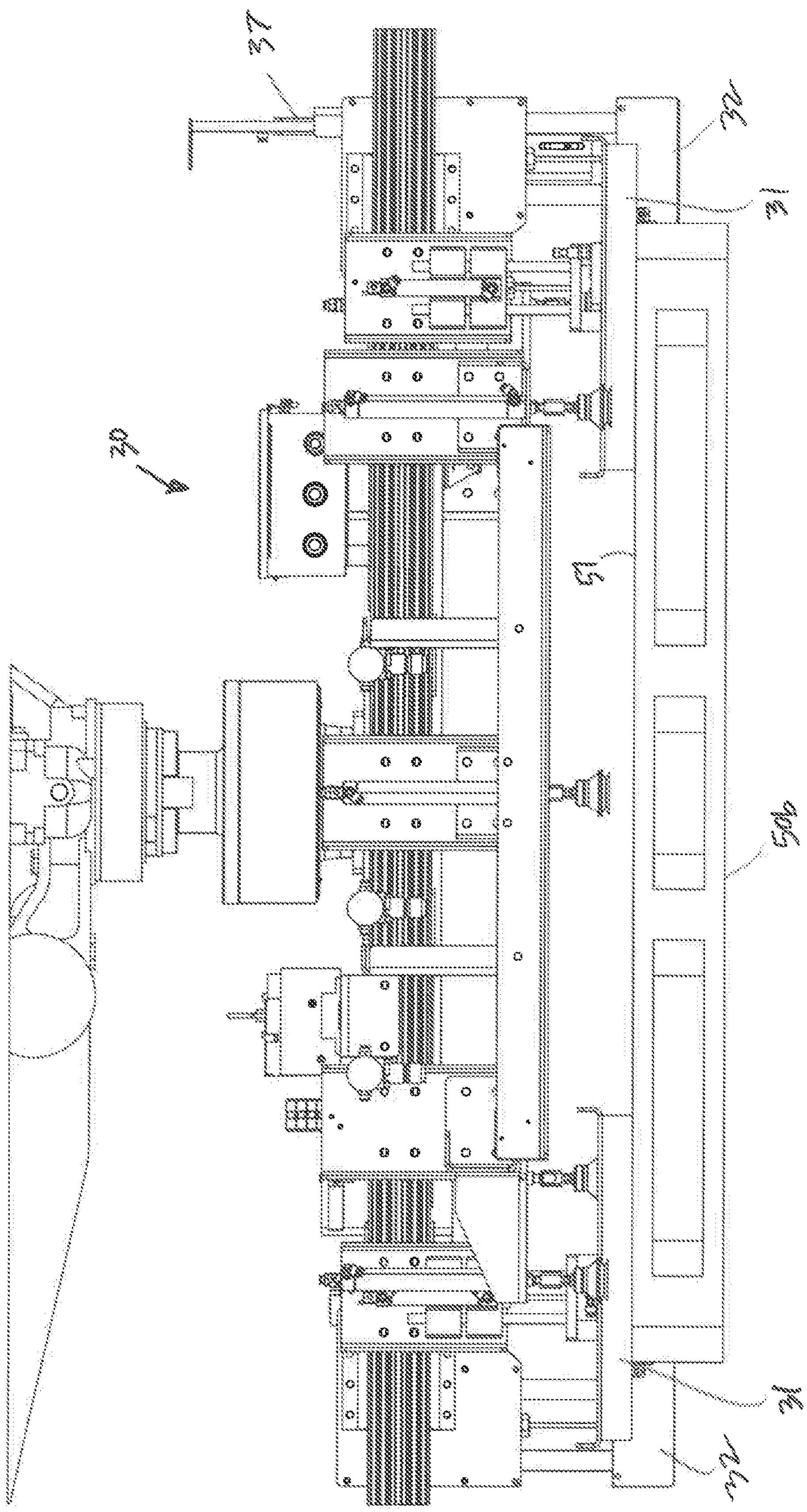

Referring to FIGS. 6A-6D, the robot head 30 further includes a plurality of pairs of end grippers 32 for selectively manipulating dunnage 50 (i.e., pallets 50*b*). In one implementation, the robot head 30 contains two pairs of end grippers 32 that are configured to engage a pallet 50*b* at each end thereof. More specifically, the two pairs of end grippers 32 are configured to engage openings 53 (FIG. 6B) in the pallets 50*b* provided at short side portions thereof. Accordingly, the two pairs of end grippers 31 are separated from each other sufficient to engage the pallet 50*b* at the short side end portions. In one implementation, the two pairs of end grippers 32 are spaced to manipulate a standard-sized pallet of 48×40 inches and 3-4 inch thick. Each end gripper 32 includes a curved portion 36 to engage the pallet 50*b*. This curved portion 36 ensures that the gripper 32 is securely engaged to the pallet 50*b*. In one implementation, each pair of end grippers 32 is moveable or selectively moveable towards each other in order to engage the pallet 50*b* (FIG. 6C). More specifically, each pair of end grippers 32 moves towards each other (and inserted into the openings 53), and then each pair of end grippers 32 moves upwards towards the pallet 50*b* for proper engagement. In another implementation, each pair of end grippers 32 is moveable or selectively moveable away from each other when attempting to release the pallet 50*b* (FIG. 6A). In some implementations, each end gripper 32 is driven by an actuator 37, such as a pneumatic actuator connected to a pressurized air source (not shown) attached to each gripper 32.

While the exemplary embodiments illustrated herein describe two pairs of end grippers, it should be noted that this is not limited by herein and other numbers of grippers may be employed. For example, there may be only three or more end grippers at each end thereof.

Figure 6D:
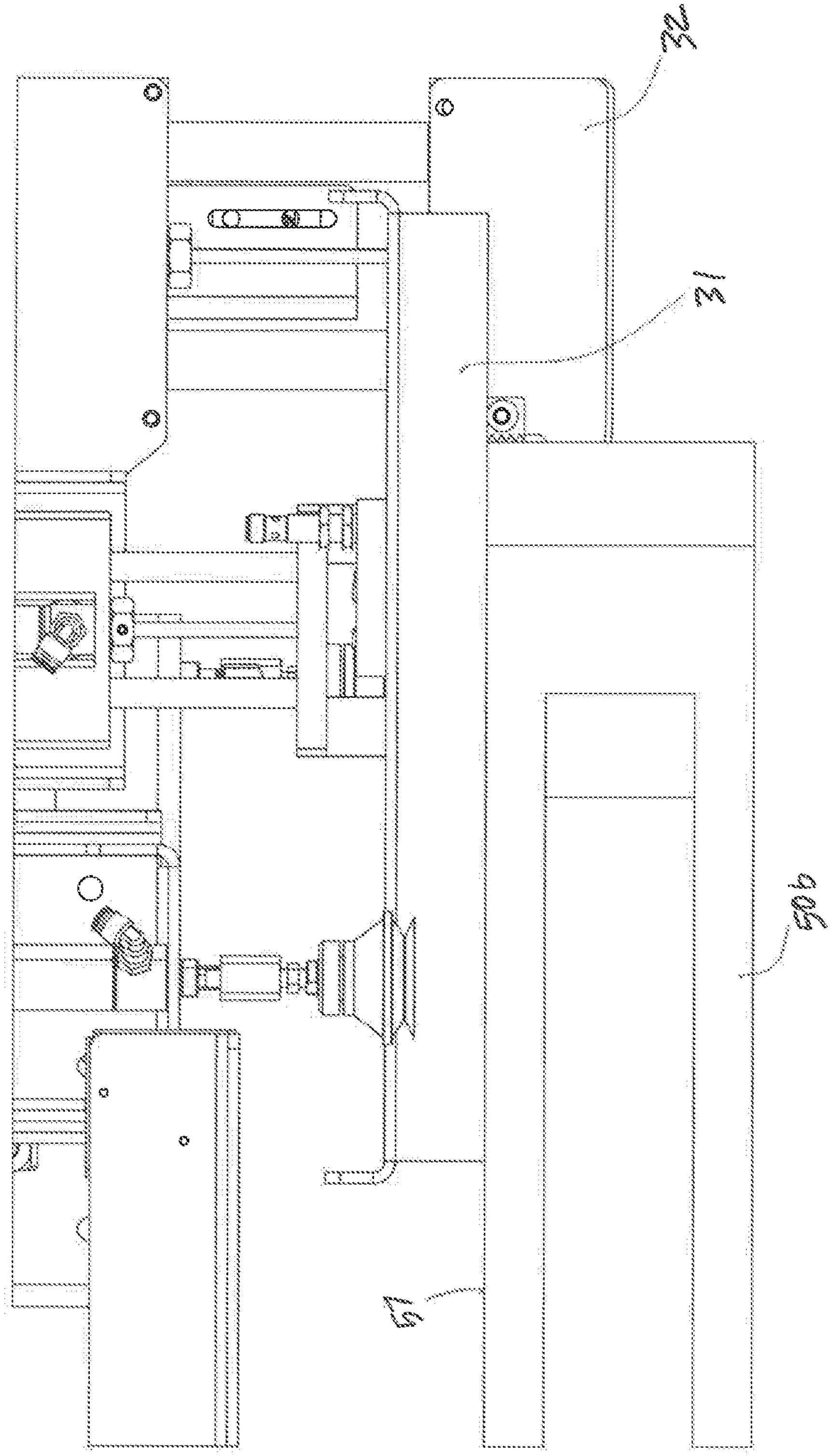
Figure 7A:
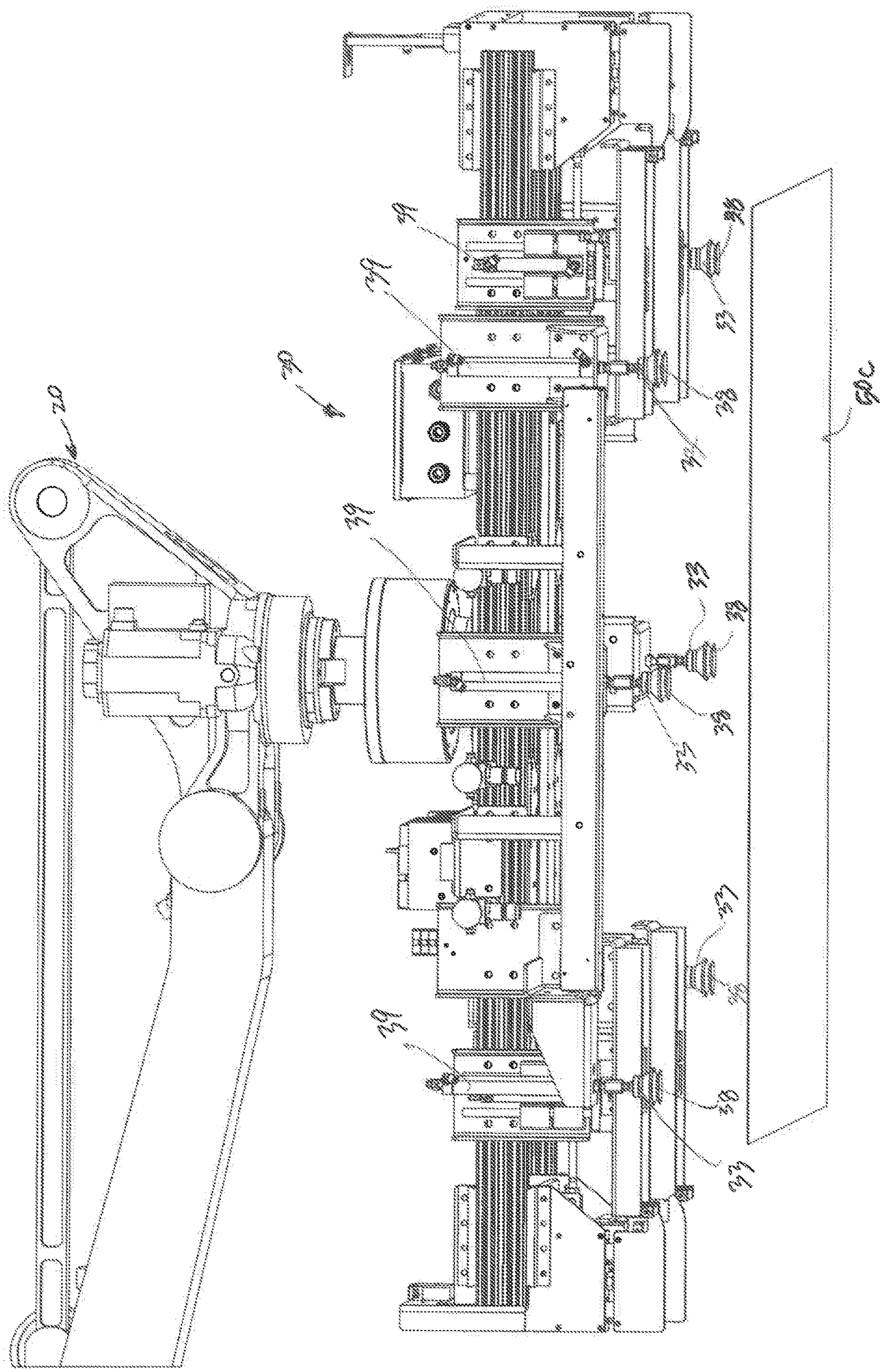
FIGS. 7A-7D are views of an exemplary robot head engaging with a slip sheet, according to example embodiments of the present disclosure.
Figure 7B:
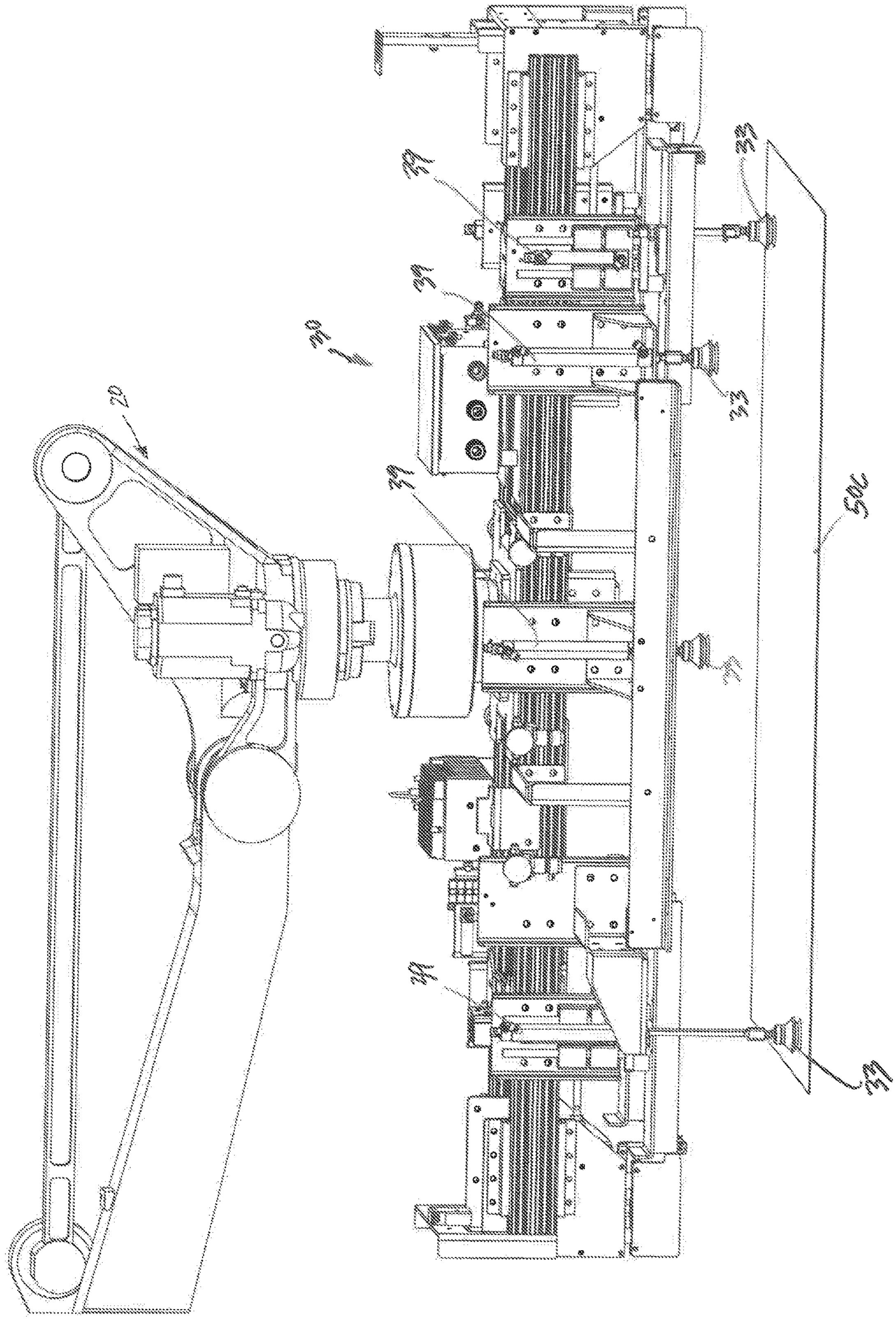
Figure 7C:
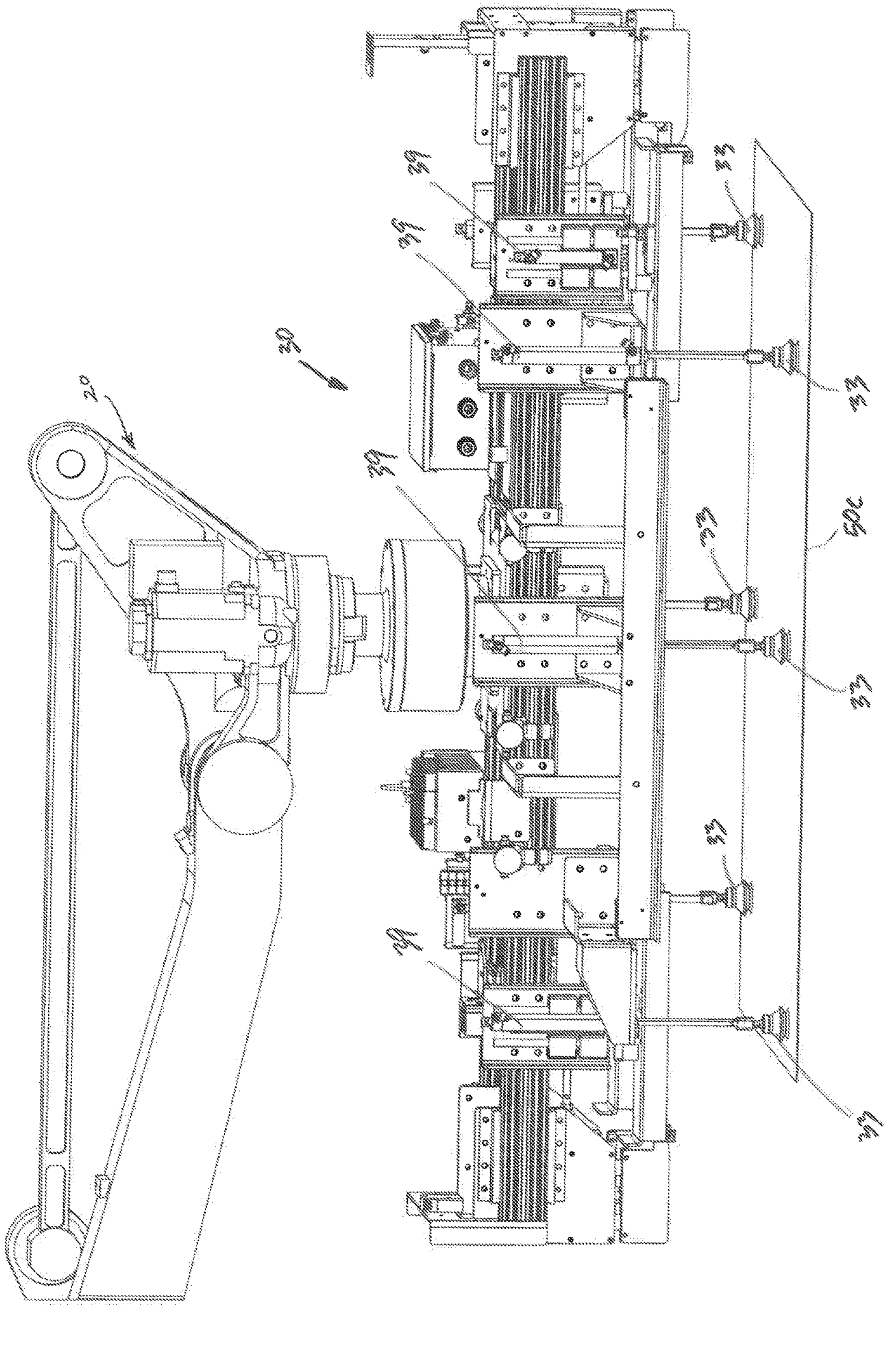
Figure 7D:
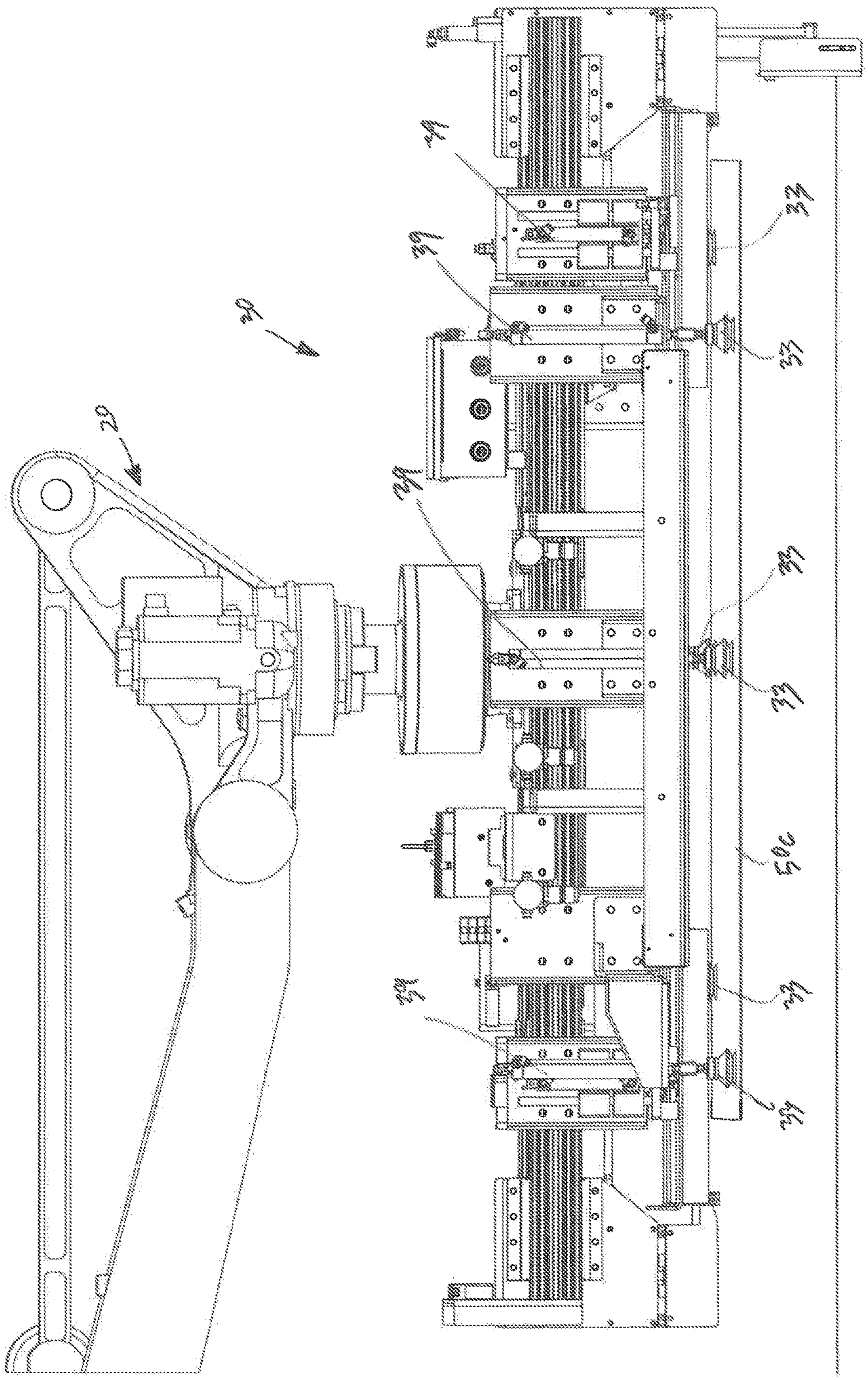

In some implementations, in conjunction with the pair of end grippers 32, the two pairs of grippers 31 (used primarily for top frames 50*a*) also interacts to engage with the pallet 50*b*. For instance, as shown in FIGS. 6C and 6D, when the pair of end grippers 32 engage with the pallet 50*b*, the two pairs of grippers 31 engage a top surface 57 of the pallet 50*b* to hold the pallet 50*b* while transporting the pallet 50*b* to the collection area 52. To describe differently, when each pair of end grippers 32 moves towards each other to engage the pallet 50*b*, each pair of grippers 31 then moves downwardly towards the top surface of the pallet 50*b* to engage the pallet 50*b*. This creates a stable and firm hold on the pallet 50*b* engaged by both the pair of end grippers 32 and the two pairs of grippers 31. In addition, this ensures that the pallet 50*b* is properly aligned when transporting to the collection area 52 for proper alignment stacking. It should be appreciated that at this operation the jaws 34*a*, 34*b* of the two pairs of grippers 31 are non-operational as the gripping effect is performed by the pair of end grippers 32.

Referring to FIGS. 7A-7D, the robot head 30 also includes a plurality of suction grippers 33 for selectively manipulating dunnage 50 (i.e., slip sheets). In one implementation, the robot head 30 contains three pairs of suction grippers 33 that are configured to engage the slip sheet 50*c*. The three pairs of suction grippers 33 are separated from each other sufficient to grip the slip sheet 50*c*. For example, the three pairs of suction grippers 33 are spaced apart to engage a standard-sized slip sheet of 48×40 inches. Each suction gripper 33 includes a plunger 38 to be brought into compressive physical contact with the slip sheet. The plunger 38 either is sufficiently flattened against a surface of the slip sheet 50*c* or, by virtue of a pneumatic air source, to develop a vacuum inside the plungers 38 sufficient to lift the slip sheet 50*c*. In some implementations, plungers 38 are driven by an actuator 39, such as a pneumatic actuator connected to a pressurized air source (not shown) attached to each plunger 38.

While exemplary embodiments illustrated herein describe three pairs of suction grippers, it should be noted that this is not limited by herein and other numbers of suction grippers may be employed. For example, there may be more or less than three pairs of suction grippers thereof.

Referring now to FIGS. 8A-8G, the robot head 30 includes a plurality of sensors 40 for determining a type of dunnage 50. In one implementation, each sensor 40 is a photoelectric sensor (or a photoeye sensor) that detects a change in light intensity. This can correspond to either non-detection or detection of the sensor's emitted light source. In one implementation, the sensor 40 can be in a proximity mode, where light from a transmitter strikes the dunnage 50 which reflects light at arbitrary angles and returns the reflected light to a receiver. For instance, the system 10, via the sensor 40, can determine that the dunnage 50 is either a slip sheet 50*c* in response to the sensor 40 detecting a constant light intensity (i.e., constant surface), a top frame 50*a* in response to the sensor 40 detecting a substantial drop of light intensity deviation near an end of the dunnage 50, or a pallet 50*b* in response to the sensor 40 detecting substantial multiple drops of light intensity of the dunnage 50.

As shown in FIG. 8A-8D, the robot 20 including the robot head 30 moves a pair of sensors 40*a*, 40*b* towards the stack of dunnage 50 of different types. In some implementations, sensors 40*a*, 40*b* can be attached on an arm member 43 that is configured to extend towards the dunnage 50 (FIG. 8C) or retract back to the base 21 of the robot 20 (FIG. 8A). The arm member 43 is configured to be driven to its extended and retracted states via an actuator 45, such as a pneumatic actuator connected to a pressurized air source (not shown) As shown in FIG. 8A, in its retracted state, sensor 40*b* (and sensor 40*b*) is at a distance from the stack of dunnage 50. In one implementation, sensors 40*a*, 40*b* can be approximately two feet from an edge of the stack of dunnage 50. This ensures sufficient clearance between the robot head 30 and the base structure of the robot 20 is provided prior to engaging the dunnage 50. As sensors 40*a*, 40*b* advance towards the edge of the stacked dunnage 50 (FIG. 8B), sensors 40*a*, 40*b* begin to detect the type of dunnage based on the predetermined light intensity measurement. In this exemplary case, as shown in FIG. 8A, sensors 40*a*, 40*b* detect a presence of a slip sheet 50*c*. This is due to the fact that the light intensity is constant as measured by sensors 40*a*, 40*b*. In one implementation, referencing FIG. 8D, sensor 40*a* is measuring by creating a scanning path recorded in a horizontal direction thereof and sensor 40*b* is measuring by creating a scanning path recorded in a vertical direction thereof, while the arm member 43 extends from its initial position. In other implementations, the scanning path is recorded in three dimensions (i.e., x,y,z) where 40*a* provides the x-measurement, the actuator 45 travels along a fixed y-measurement, and 40*b* provides the z-measurement. The scanning algorithm looks through the sensor path to identify the edge point of the dunnage 50, for use in computing a fourth dimensional pick point.

Figure 8E:
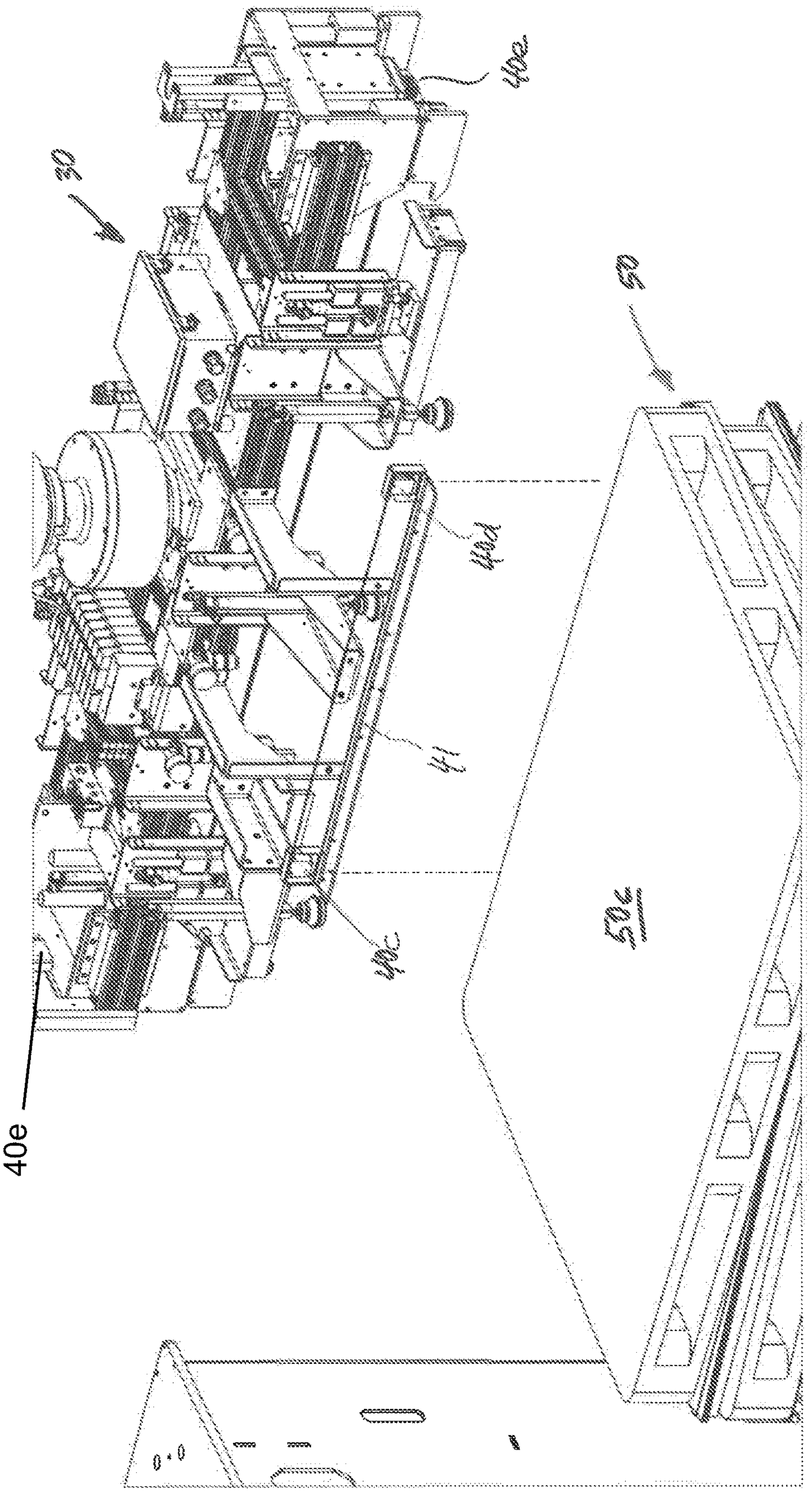
Figure 8E:
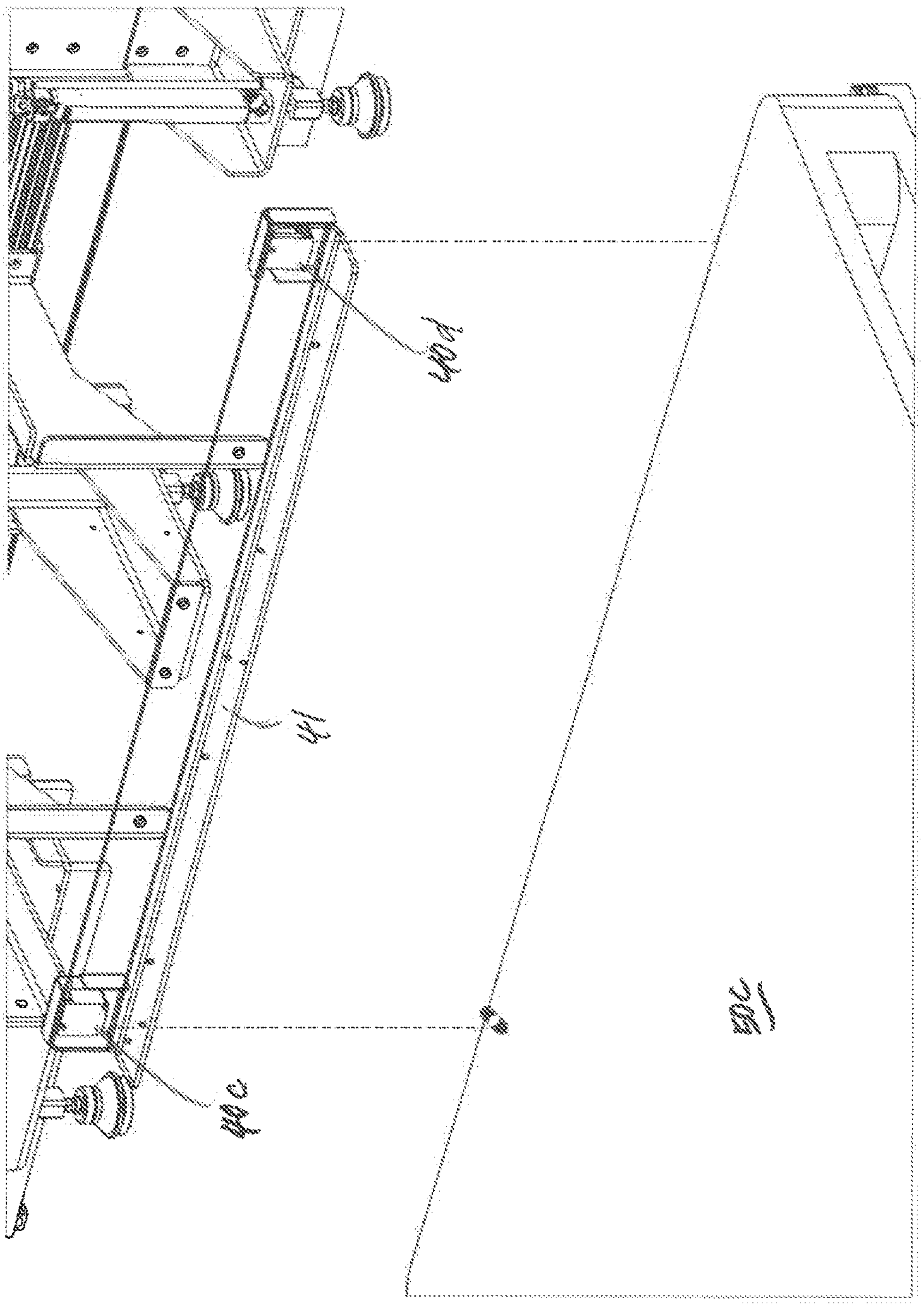
Figure 8G:
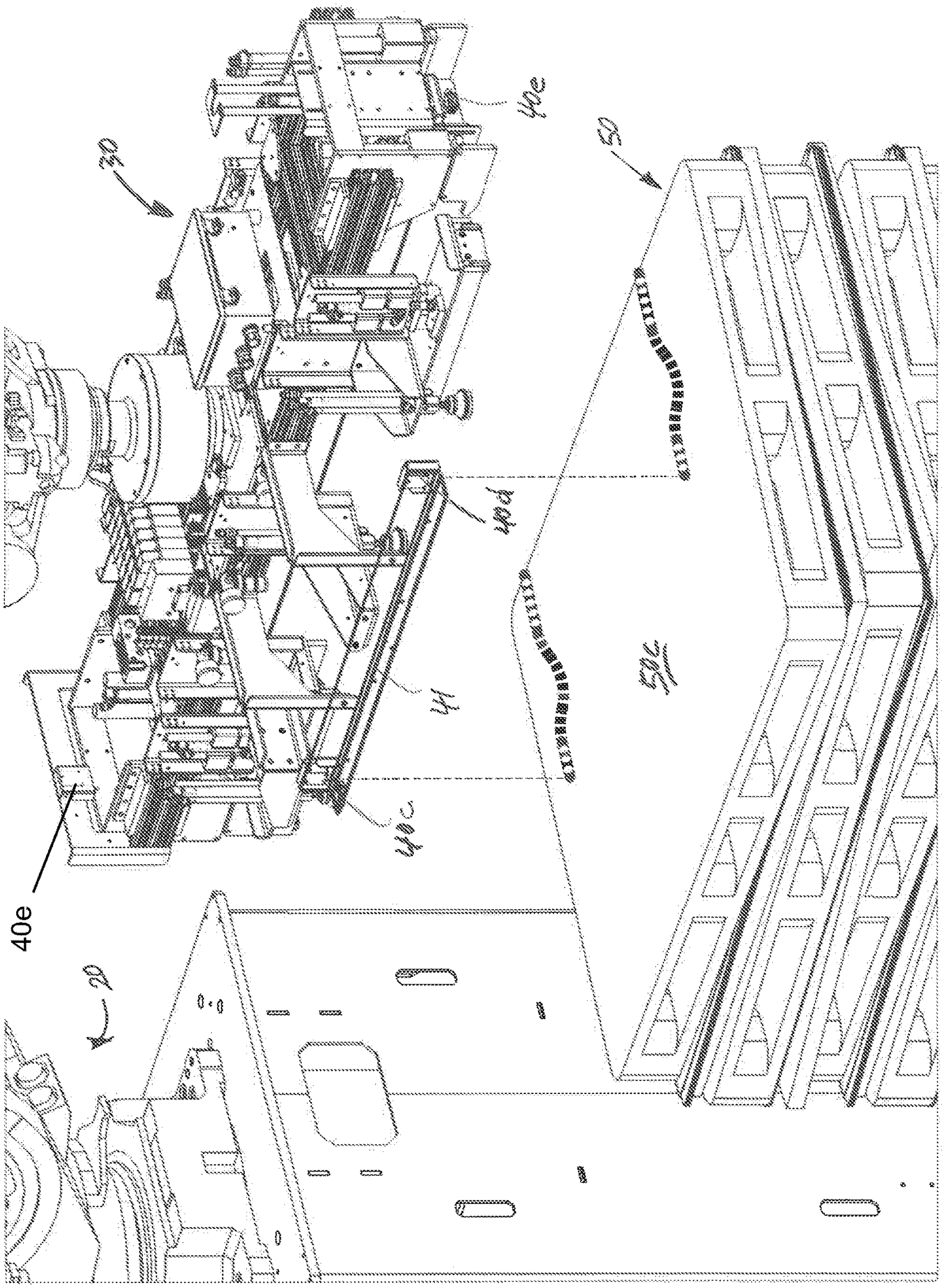
Figure 9:
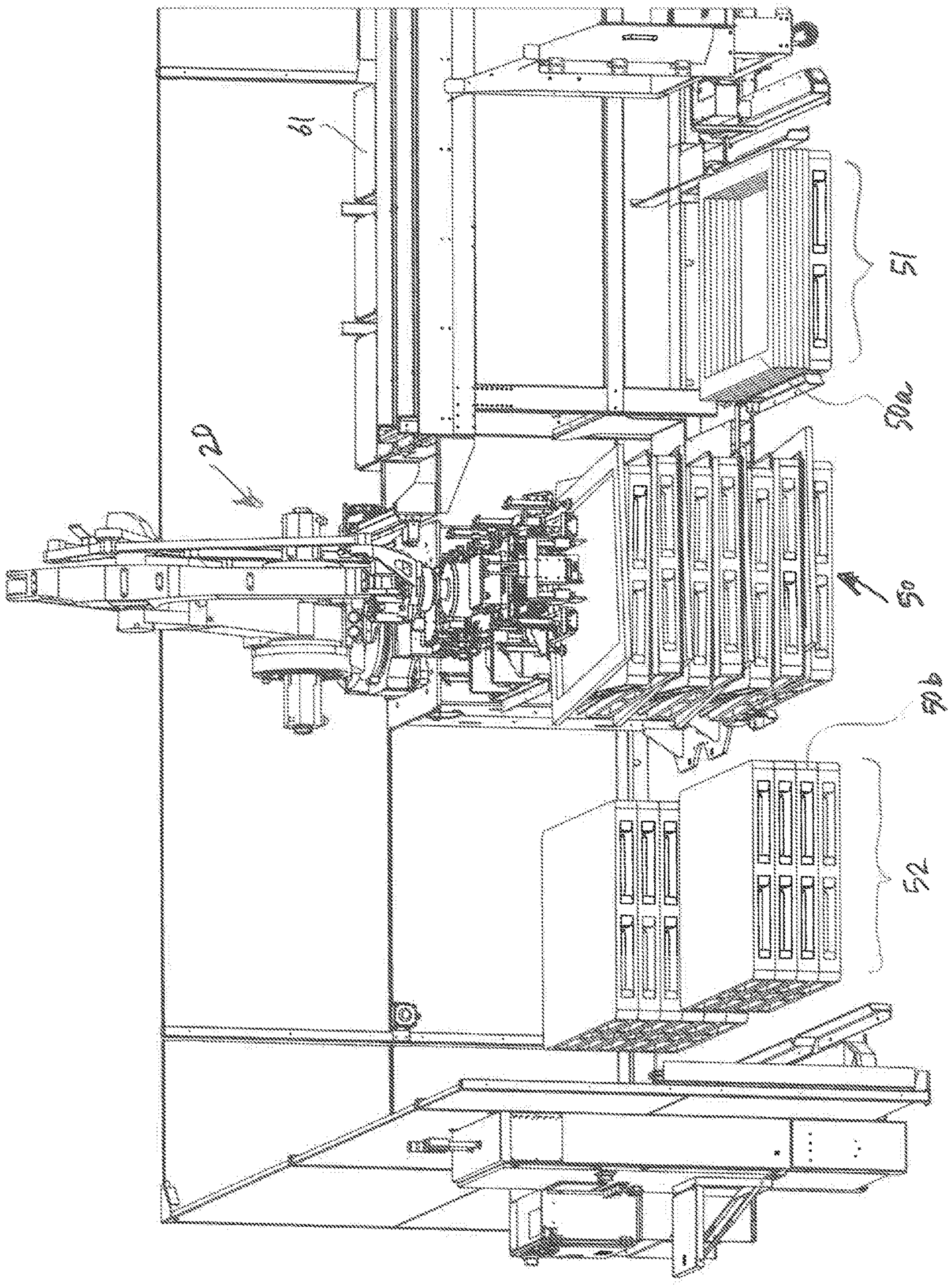
FIG. 9 is a perspective view of a robot over a mixed dunnage stack, according to an example embodiment of the present disclosure.

Referring now to FIGS. 8E-8G, in another example embodiment, sensors 40*c*, 40*d*, 40*e* can be mounted on the robot head 30. More specifically, sensors 40*c*, 40*d* can be mounted on a frame 41 of the robot head 30, which extends along on a long-sided portion of the robot head 30. As such, when detecting the topmost dunnage 50, the robot head 30 moves along in a transverse direction with respect to the long-sided portion of the topmost dunnage 50 (FIG. 8E). As shown, sensor 40*e* is positioned in an orthogonal direction with respect to sensors 40*c*, 40*d*. Accordingly, sensors 40*c*, 40*d*, 40*e* are spaced apart from each other to sufficiently read substantially the entire surface of the topmost dunnage 50.

Each of sensors 40*c*, 40*d*, 40*e* are creating scanning paths that are recorded in three dimensions (i.e., x,y,z). In some implementations, sensors 40*c*, 40*d*, 40*e* on the robot head 30 provide a z-measurement and the robot head 30 itself provides the x and y coordinates as the robot head 30 moves across the stacked dunnage 50. For example, the scanning provides a z-measurement with sensor 40*c*, 40*d*, sensor 40*e*. The scanning algorithm looks through each sensor path to identify the edge point of the dunnage 50, generating three coordinates in three dimensions that can compute a fourth dimensional pick point. It should be appreciated that the type of dunnage also contributes to the computation of the pick point. Hence, the present invention describes features and advantages that are for precision picking and placement of each dunnage.

While exemplary embodiments illustrated herein describe a pair of sensors 40, it should be noted that this is not limited by herein and other numbers of sensors may be employed. For example, there may be more than one pair of sensors 40 thereof. It should further be appreciated that the sensors 40 can be a device including at least a light source, a receiver, a signal converter, an amplifier, and an output, and will not be described in detail. It should further be appreciated that other sensors may be employed, such as, but not limited to, inductive, capacitive, magnetic and/or ultrasonic sensors.

Figure 10:
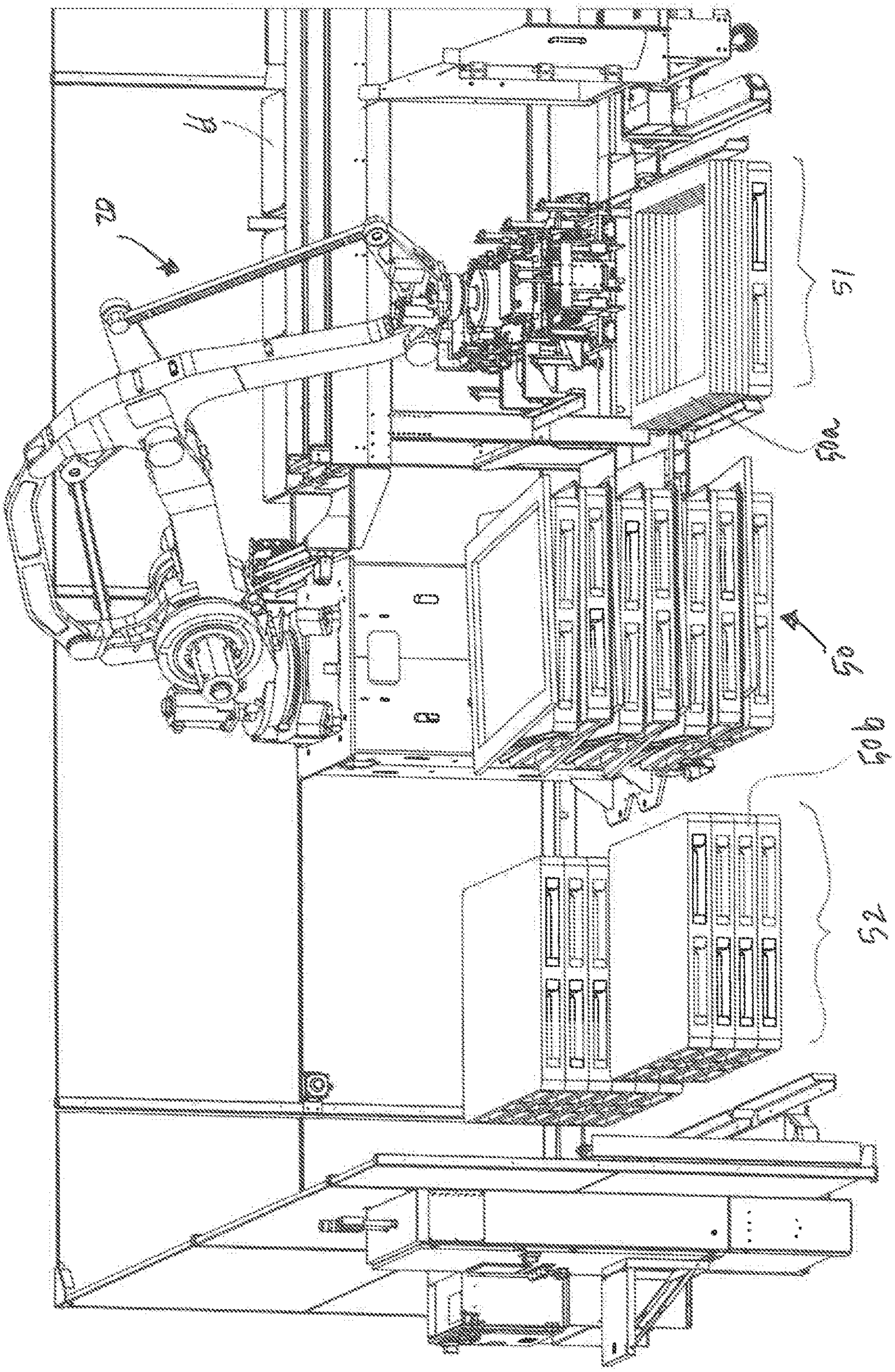
FIG. 10 is a perspective view of a robot over a top frame stack, according to an example embodiment of the present disclosure.
Figure 11:
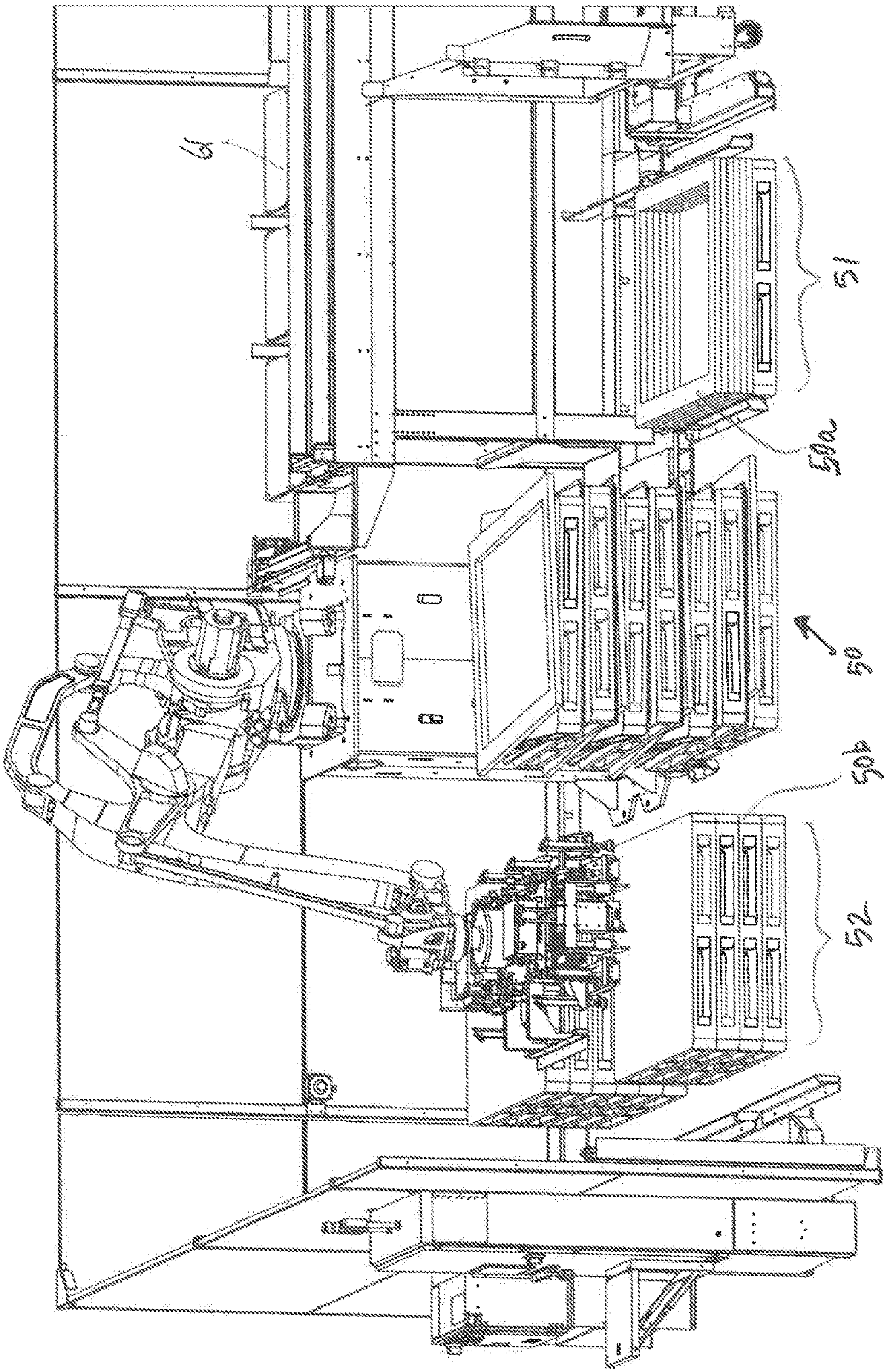
FIGS. 11 and 12 are perspective views of a robot over a pallet stack, according to an example embodiment of the present disclosure.
Figure 12:
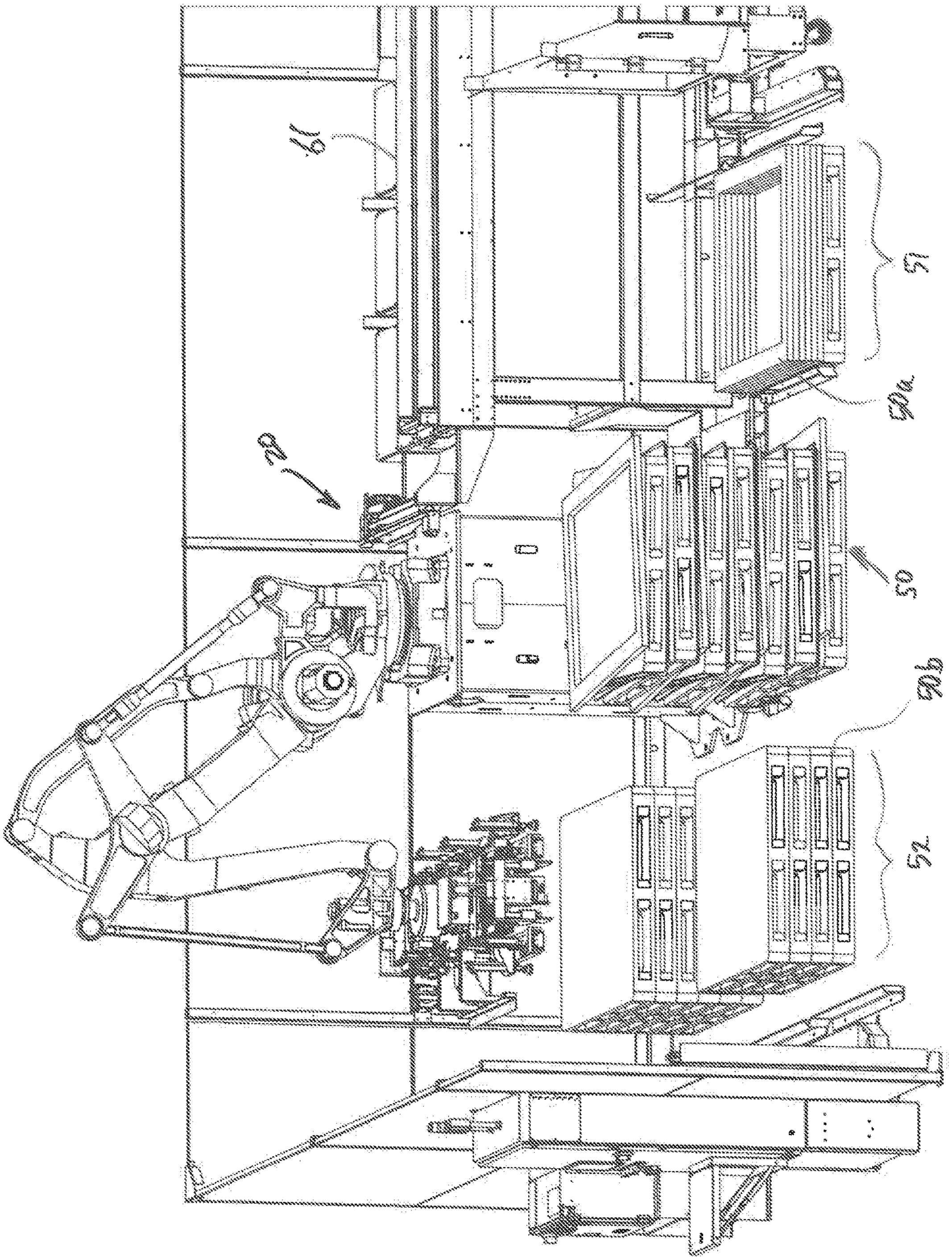
Figure 13:
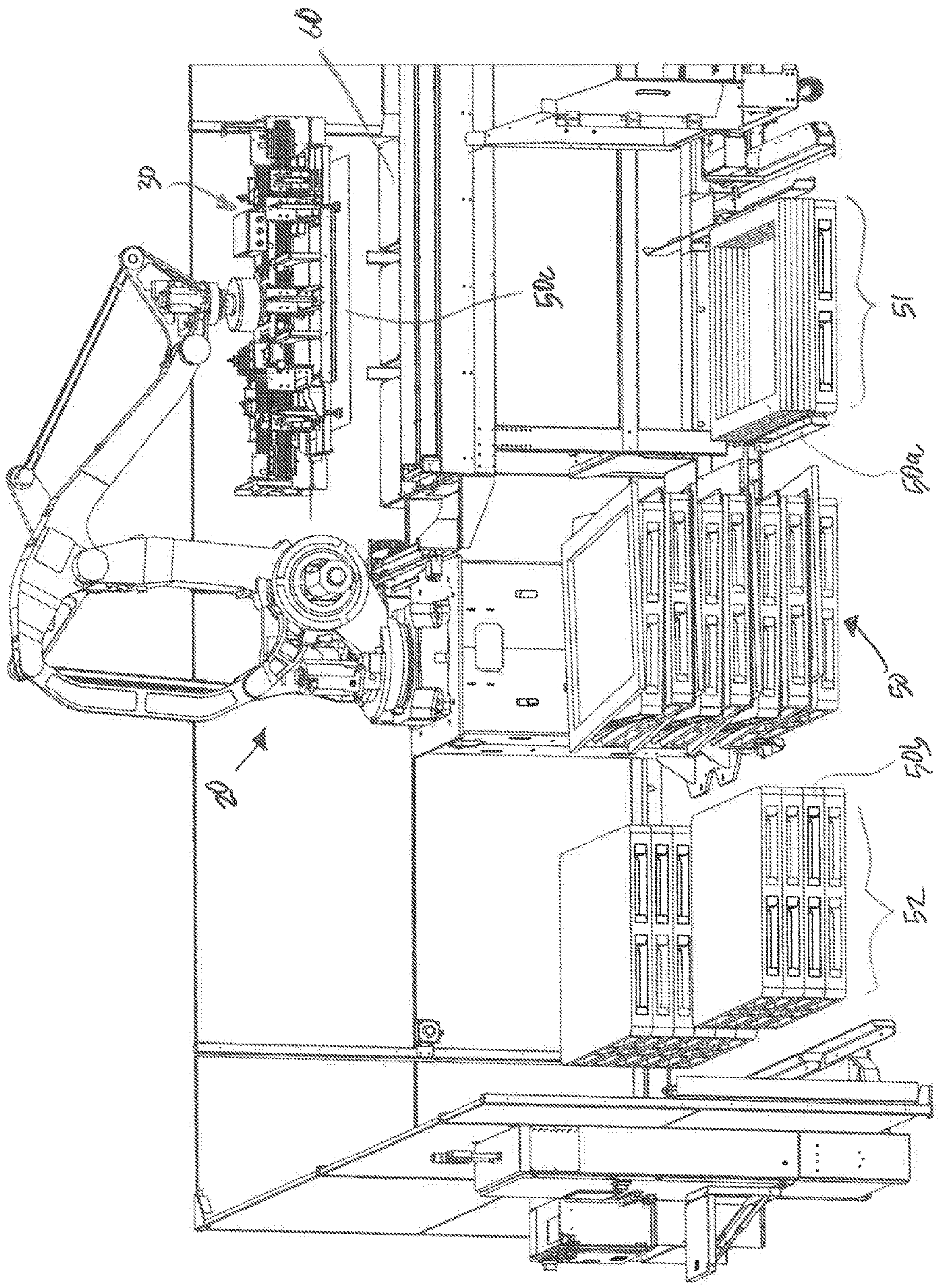
FIG. 13 is a perspective view of a robot over a slip sheet table, according to an example embodiment of the present disclosure.

Once the sensors 40 detect the type of dunnage (i.e., slip sheet, top frame, or pallet), the system 10 selects the appropriate grippers (e.g., 31, 32, 33) for engagement and transports the dunnage to the respective stacking area. For example, when a top frame 50*a* is detected, the system 10 controls the plurality of grippers 31 to engage and transports the top frame 50*a* to stacking area 51, as shown in FIG. 10. When a pallet 50*b* is detected, the system 10 controls the plurality of end grippers 32 (and the plurality of grippers 31) to engage and transports the pallet 50*b* to stacking area 52, as shown in FIG. 11. When a slip sheet 50*c* is detected, the system 10 controls the plurality of suction grippers 33 to engage and transports the slip sheet 50*c* to the inspection table 60, as shown in FIG. 13, which eventually will be transported to an inspection device 70 (e.g., camera) for further inspection.

Figure 14A:
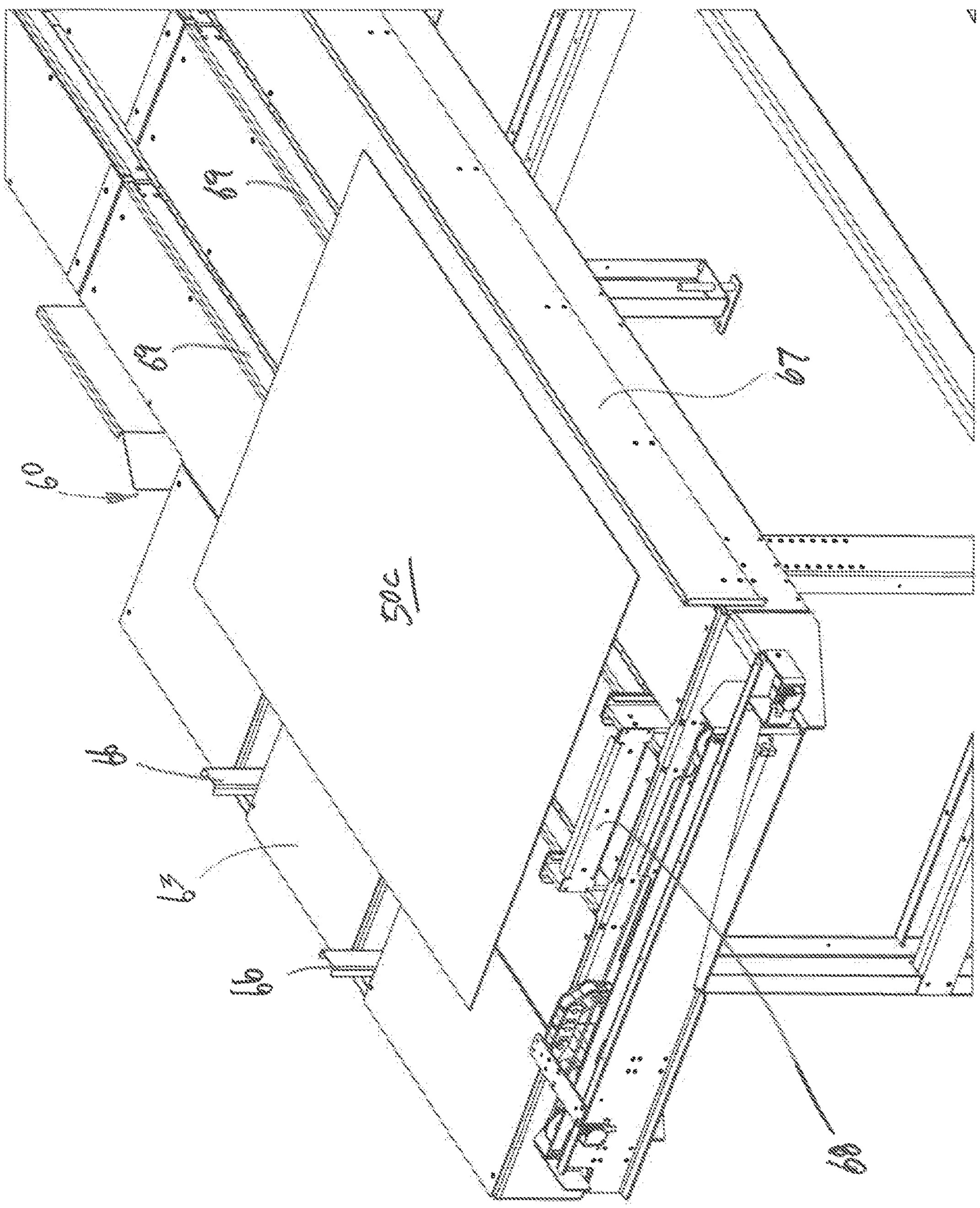
FIGS. 14A-14E are views of a slip sheet on a slip sheet table, according to example embodiments of the present disclosure.
Figure 14B:
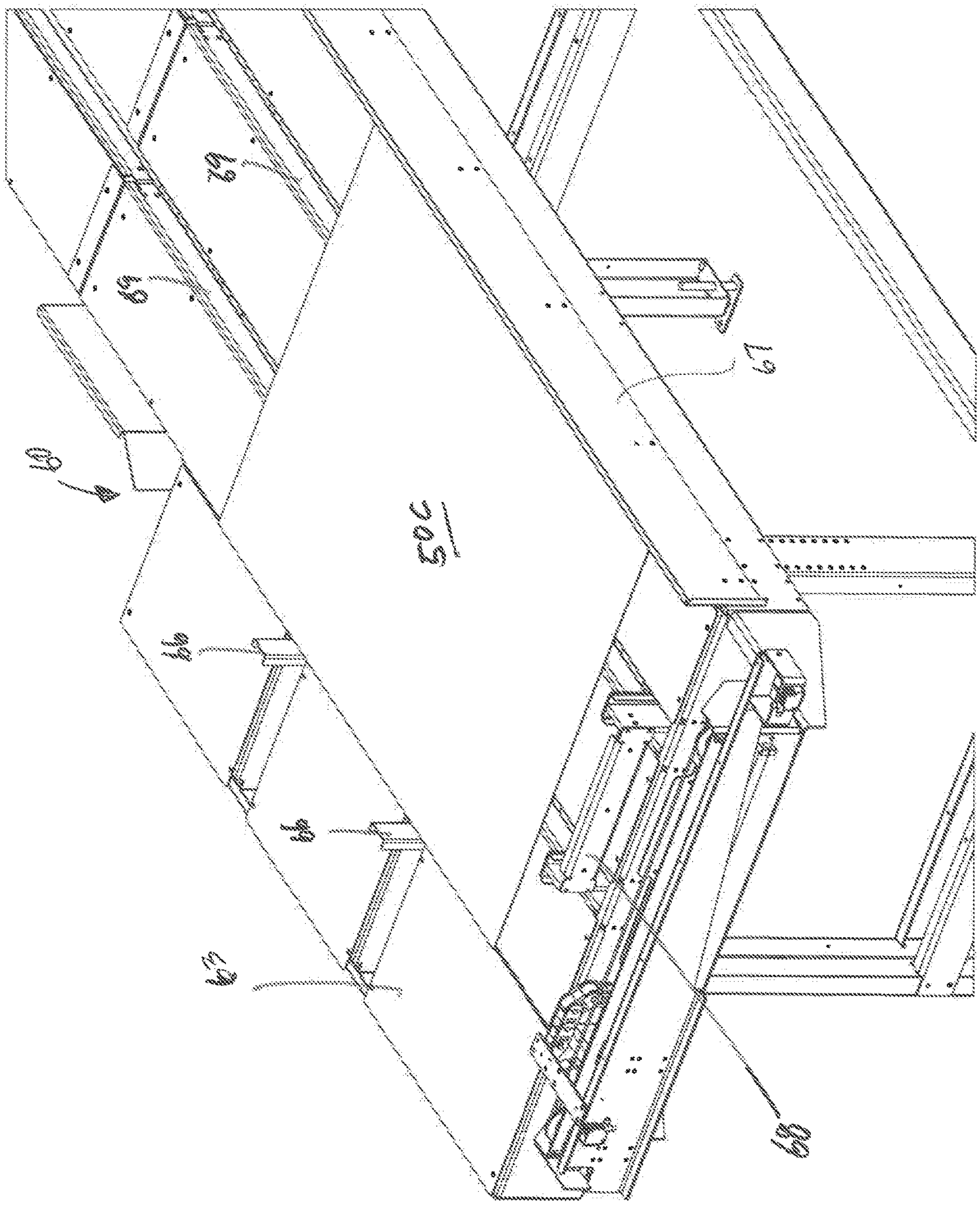
Figure 14C:
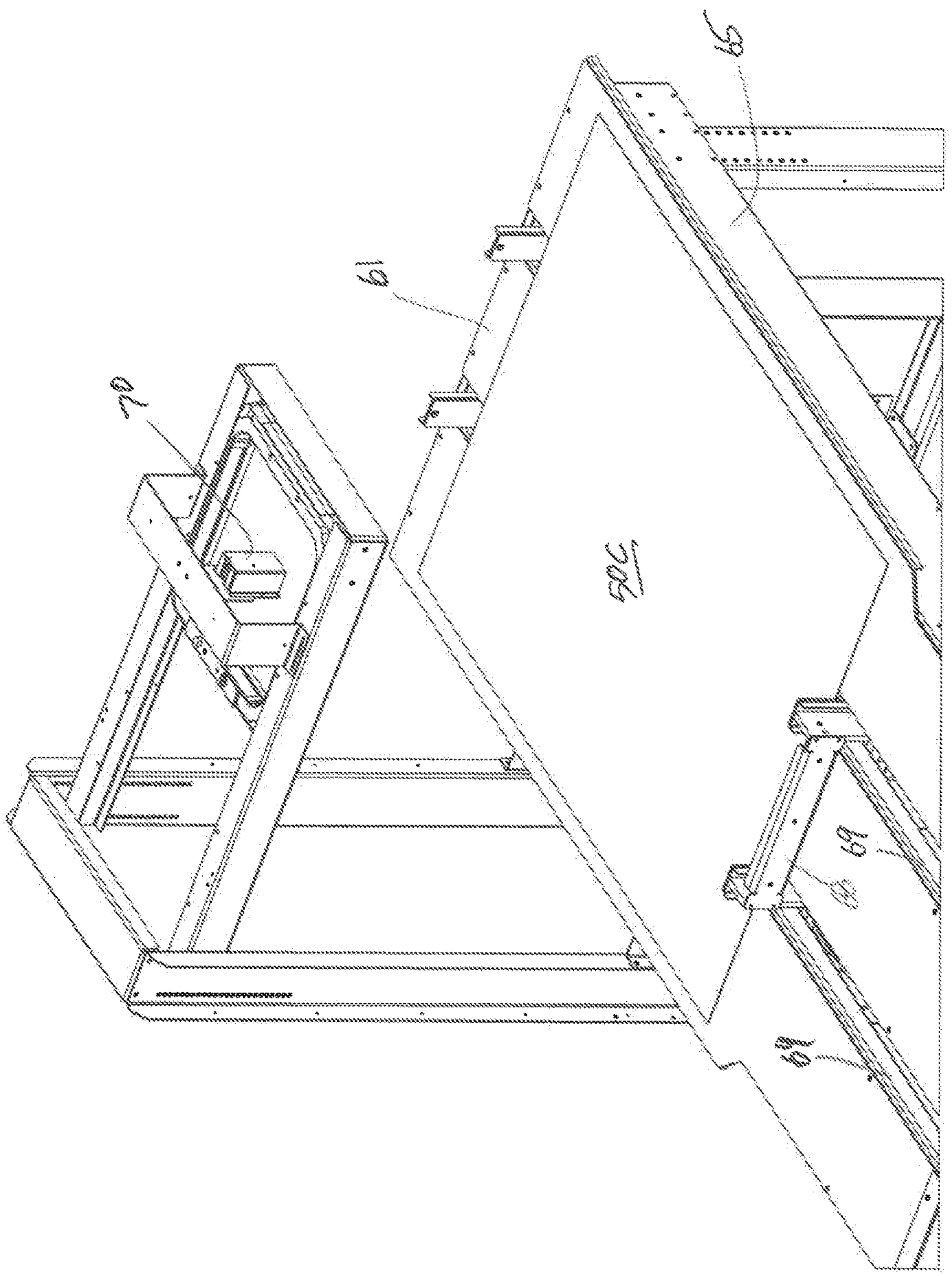
Figure 14D:
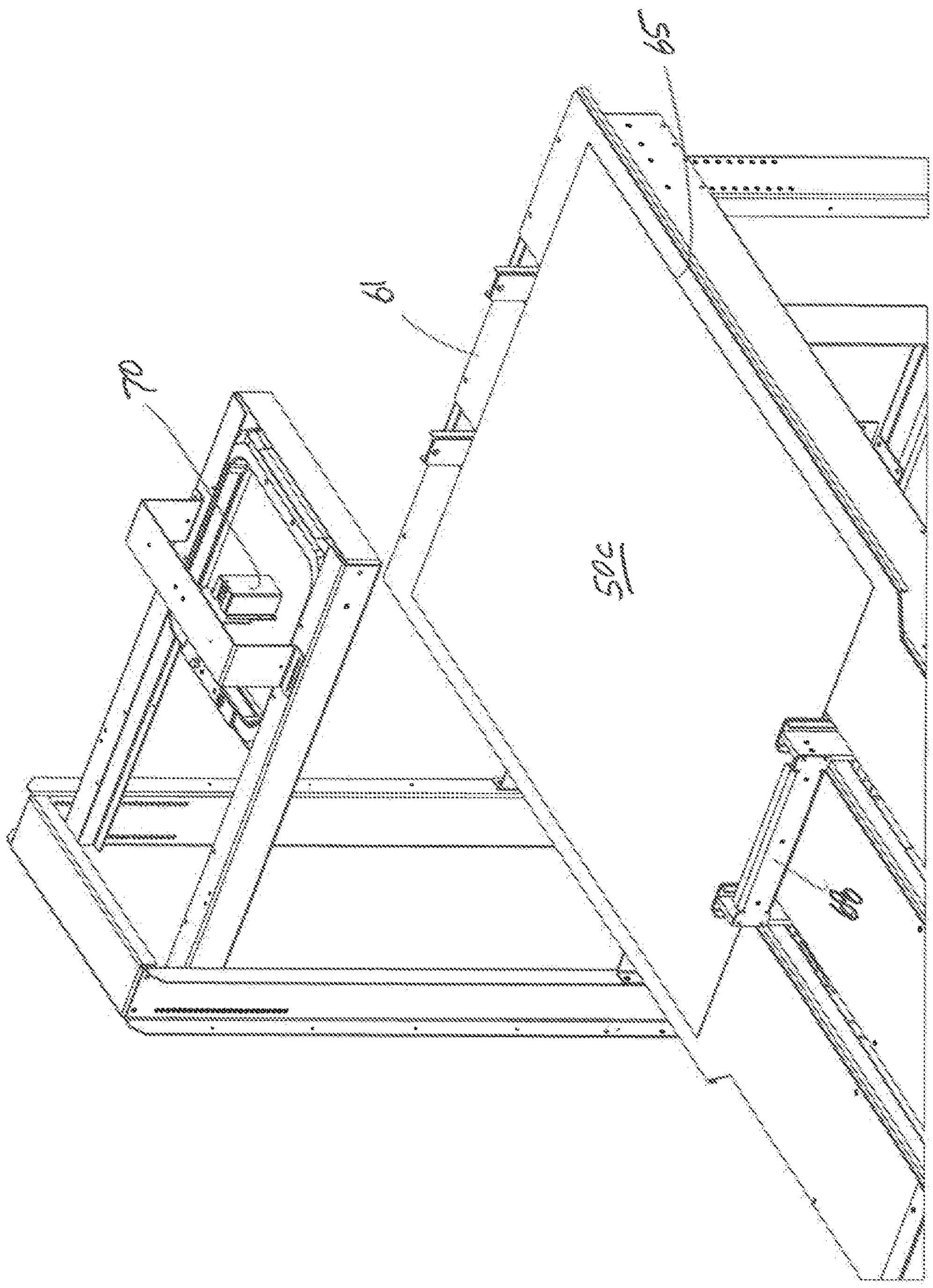
Figure 14E:
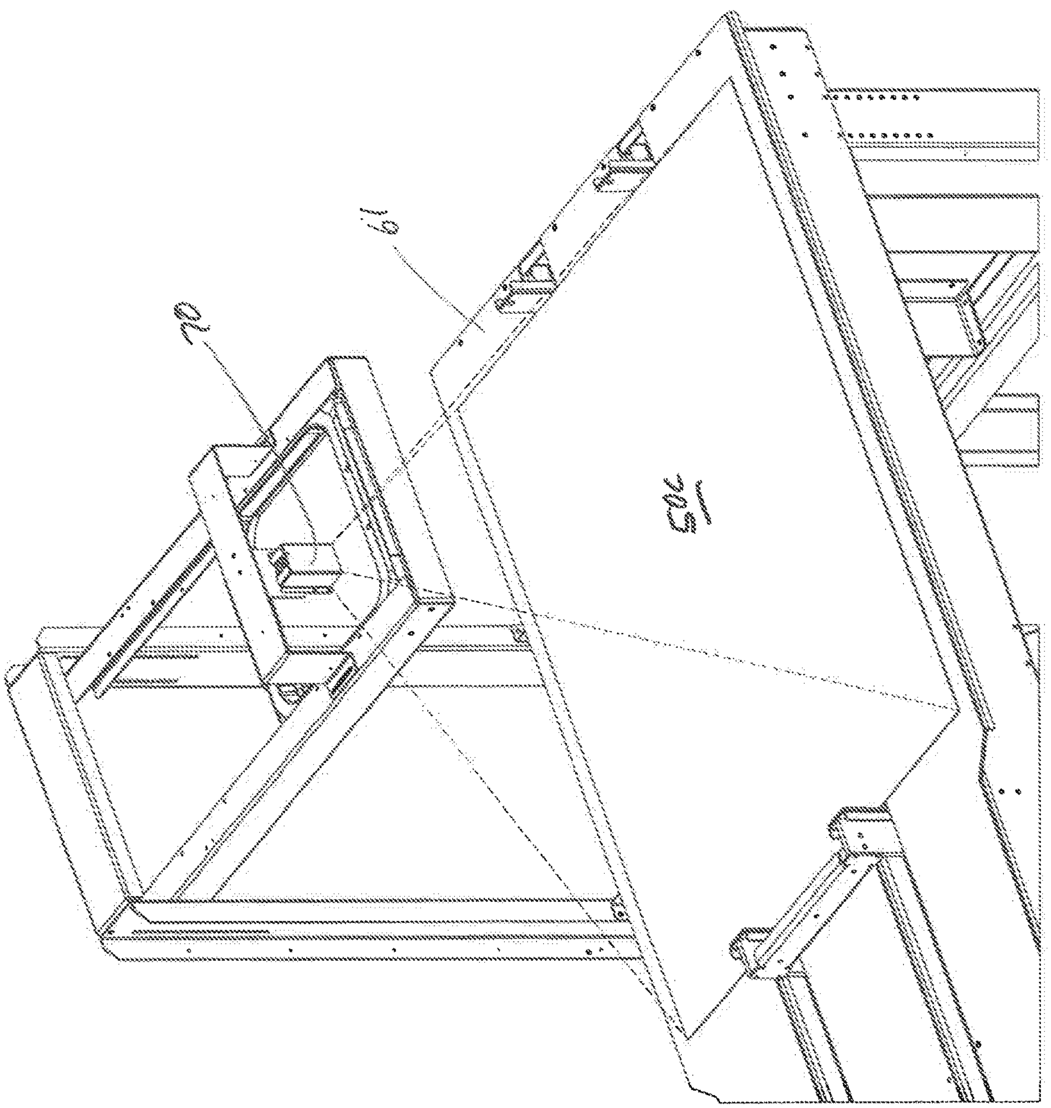

Referring to FIGS. 14A-14C, the slip sheet 50*c* is transported from the stack of dunnage 50, via robot 20, to a staging area 63 of the inspection table 60 for preparing the slip sheet 50*c* for inspection. In one implementation, the staging area 63 is configured to receive and align the slip sheet 50*c* for proper alignment. For example, as shown in FIG. 14A, a pair of guide rails 66 located at opposed side of an end frame rail 67 of the staging area 63 can be used to align the slip sheet 50*c* prior to entering the inspection area 61 of the table 60. Each guide rail 66 is configured to translate towards the slip sheet 50*c* and engage the slip sheet 50*c* for proper alignment on the table 60 (FIG. 14B). Once the slip sheet 50*c* is properly aligned in the staging area 63, a pushing plate 68 engages the slip sheet 50*c* to move along a length direction X of the table 60. This in turn moves the slip sheet 50*c* towards the inspection area 61 (FIG. 14C) to inspect the slip sheet 50*c* for damage. In one implementation, the pushing plate 68 moves along a slot 69 constructed within a surface of the table 60. The pushing plate 68 continues to move (i.e., push) the slip sheet 50*c* until the slip sheet 50*c* is directly below the inspection device 70 (FIG. 14D).

In some implementations, a debris removal device (not shown) can be employed to remove and clean the surface of the slip sheet 50*c* in the staging area 63. For instance, the debris removal device can be a mechanism that is located on or adjacent to the conveying table 60 that tilts or lifts up the slip sheet 50*c* and cleans any debris using pressurized air. This ensures that the slip sheet 50*c* is free of debris prior to entering the inspection area 61 of table 60, for proper reading by the inspection device 70.

It is to be understood that the operation and movement of associated components, including the guide rails 66 and/or the pushing plate 68 can be controlled by a processor or control device or controller 105 (FIG. 1), operating in a known manner, and is driven by any appropriate drive mechanism known in the art, and not limited to those disclosed in the exemplary embodiments herein.

Figure 15A:
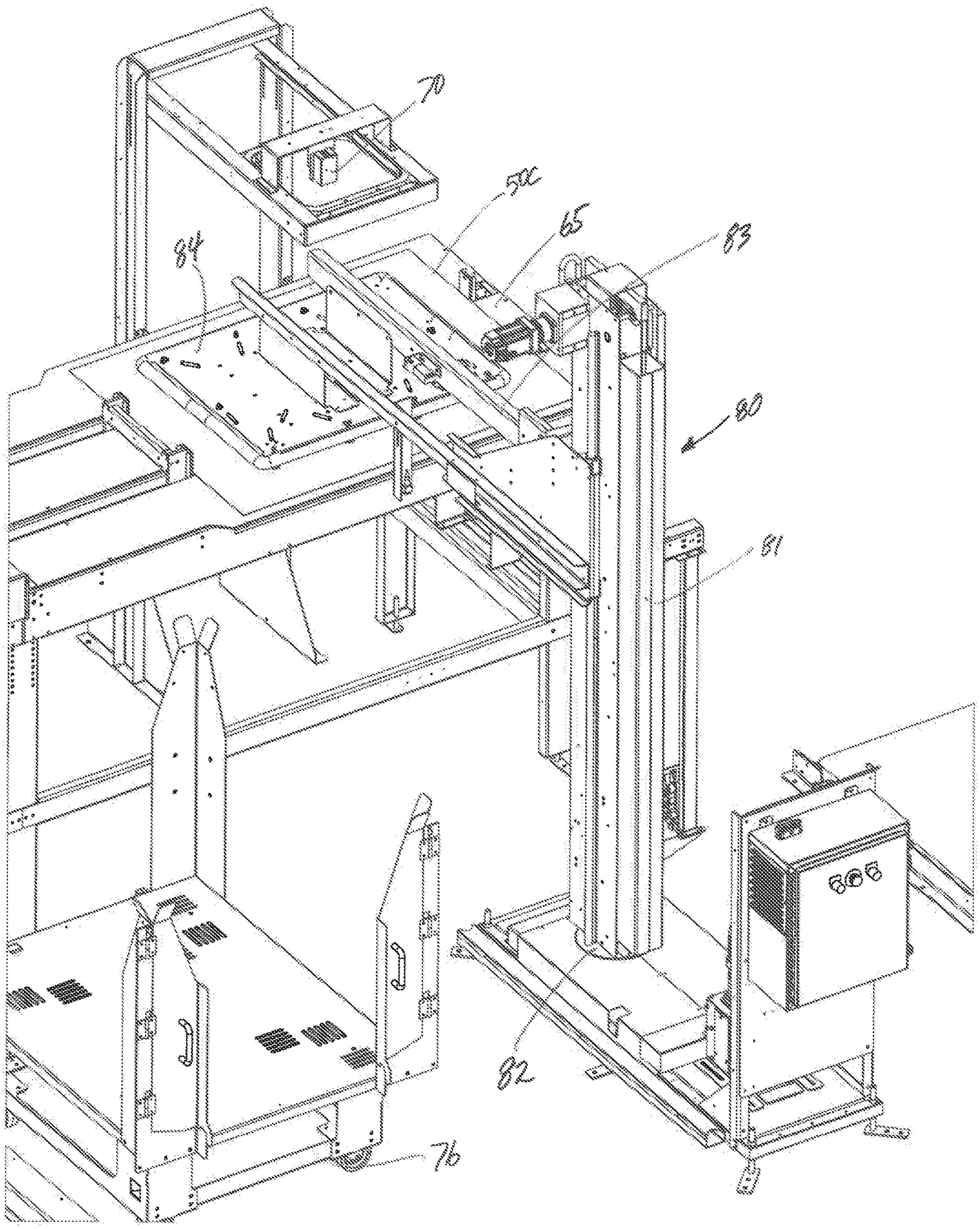
FIGS. 15A-15D are views of a stacker in operation, according to example embodiments of the present disclosure.
Figure 15B:
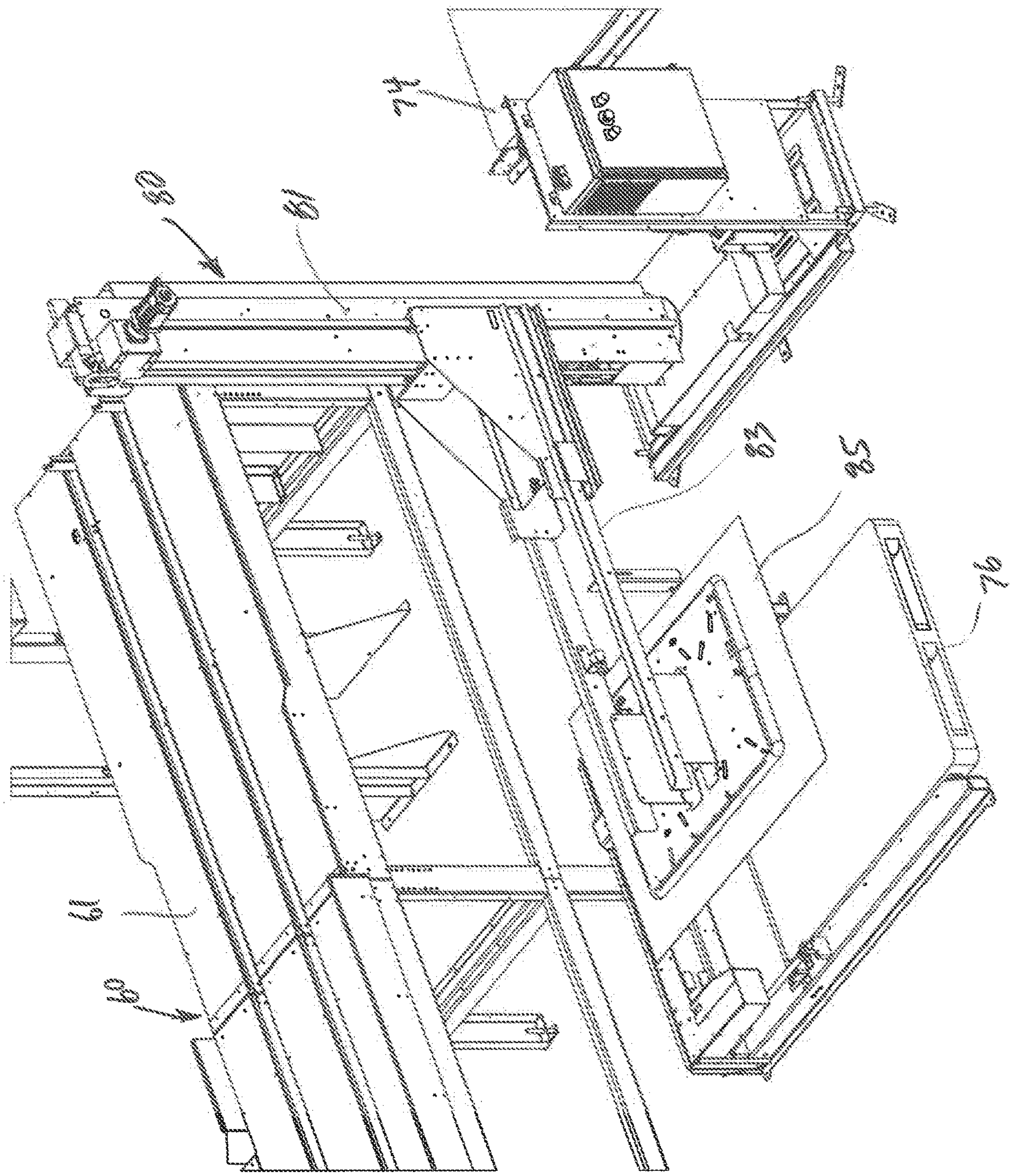
Figure 15C:
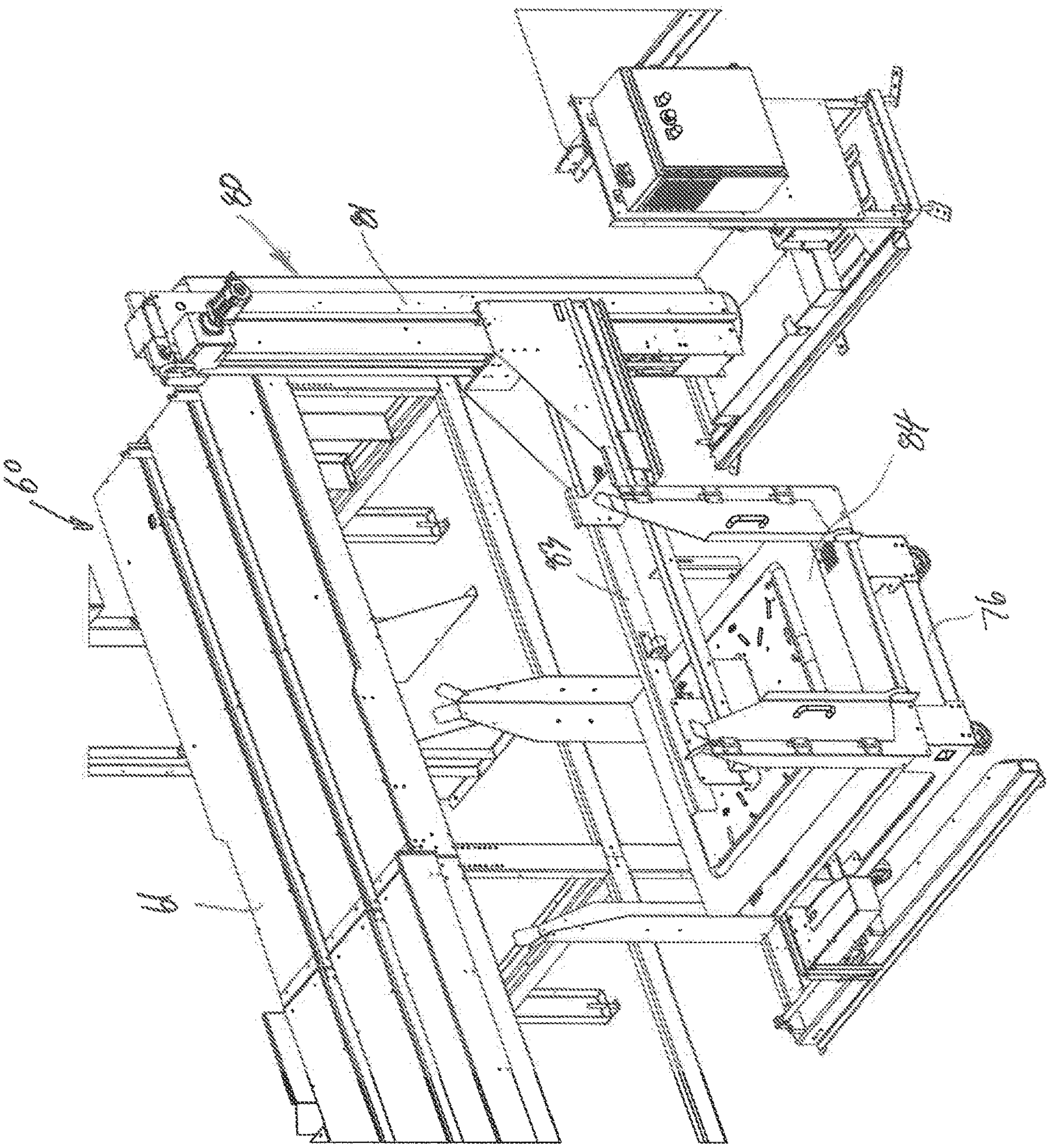
Figure 15D:
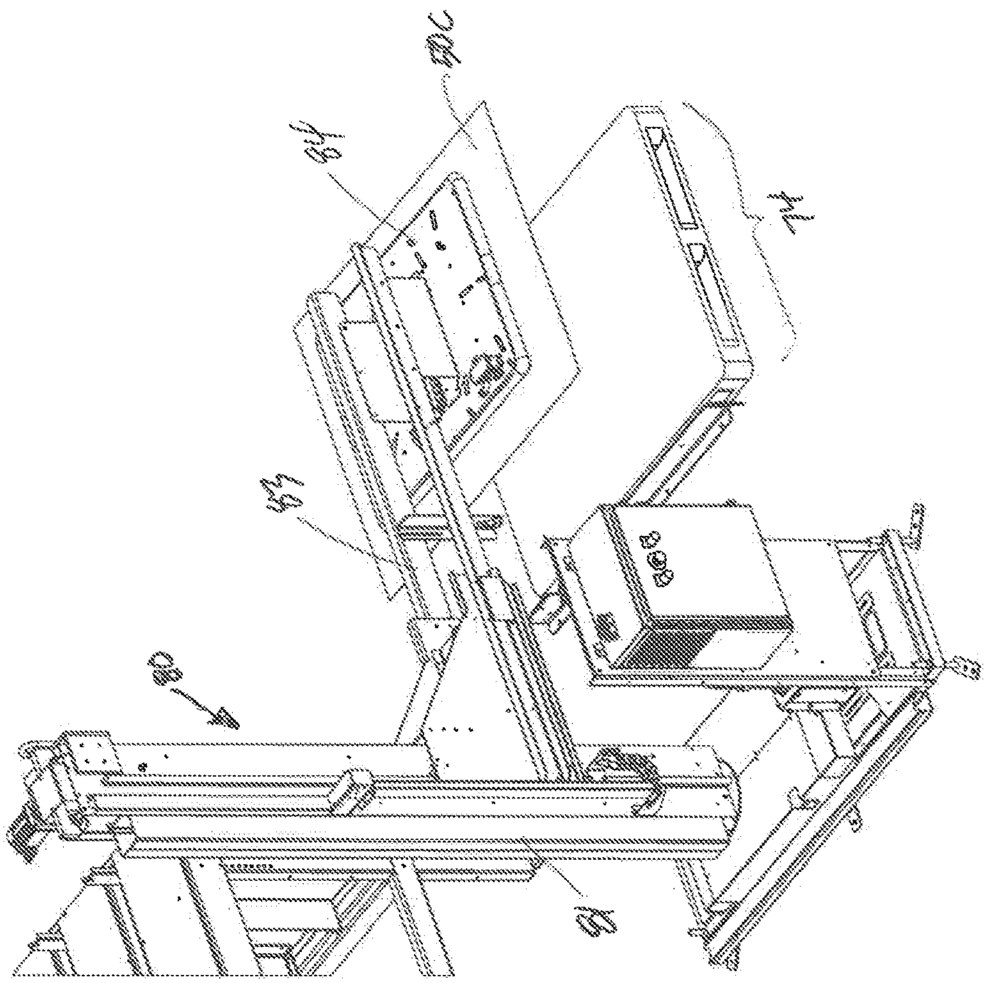

In some implementations, the inspection device 70 can be a vision camera for inspecting the surface of the slip sheet 50*c*. When the inspection device 70 detects any anomalies or defects on the slip sheet 50*c*, the system 10 will transport the defected slip sheet 50*c* to a 'failed' stacked area 74 (FIG. 15D). Such defects can include chips, cracks, dents, wrinkles, punctures, tears, blisters, foreign inclusions, etc. on the slip sheet 50*c*. On the other hand, if the system 10, via the inspection device 70, determines the slip sheet 50*c* is of good quality (no defects), the system 10 transports the slip sheet 50*c* to a slip sheet stacking tray 76 (FIG. 15B). These slip sheet 50*c* can be reused or recycled for later use.

Referring to FIGS. 15A-15D, the slip sheet 50*c* are manipulated or handled by a stacker 80. After inspection by the inspection device 70, the stacker 80 transports the slip sheet 50*c* into either the 'failed' stacked area 74 or the stacking tray 76. In some implementations, the stacker 80 includes an elongated support 81 on a rotary axis 82 that is configured to rotate 180 degrees in either direction. For example, when the system 10 detects a defected slip sheet 50*c* after retrieving the slip sheet 50*c* from the inspection area 61 from table 60, the elongated support 81 rotates clockwise (e.g., 45 degrees) to transport the slip sheet 50*c* to the failed' stacked area 74 (FIG. 15D). Alternatively, when the system 10 detects a 'good' slip sheet 50*c* after retrieving the slip sheet 50*c* from the inspection area 61 from table 60, the elongated support 81 rotates counter-clockwise (e.g., 45 degrees) to transport the slip sheet 50*c* to the stacking tray 76 (FIG. 15B).

Figure 16:
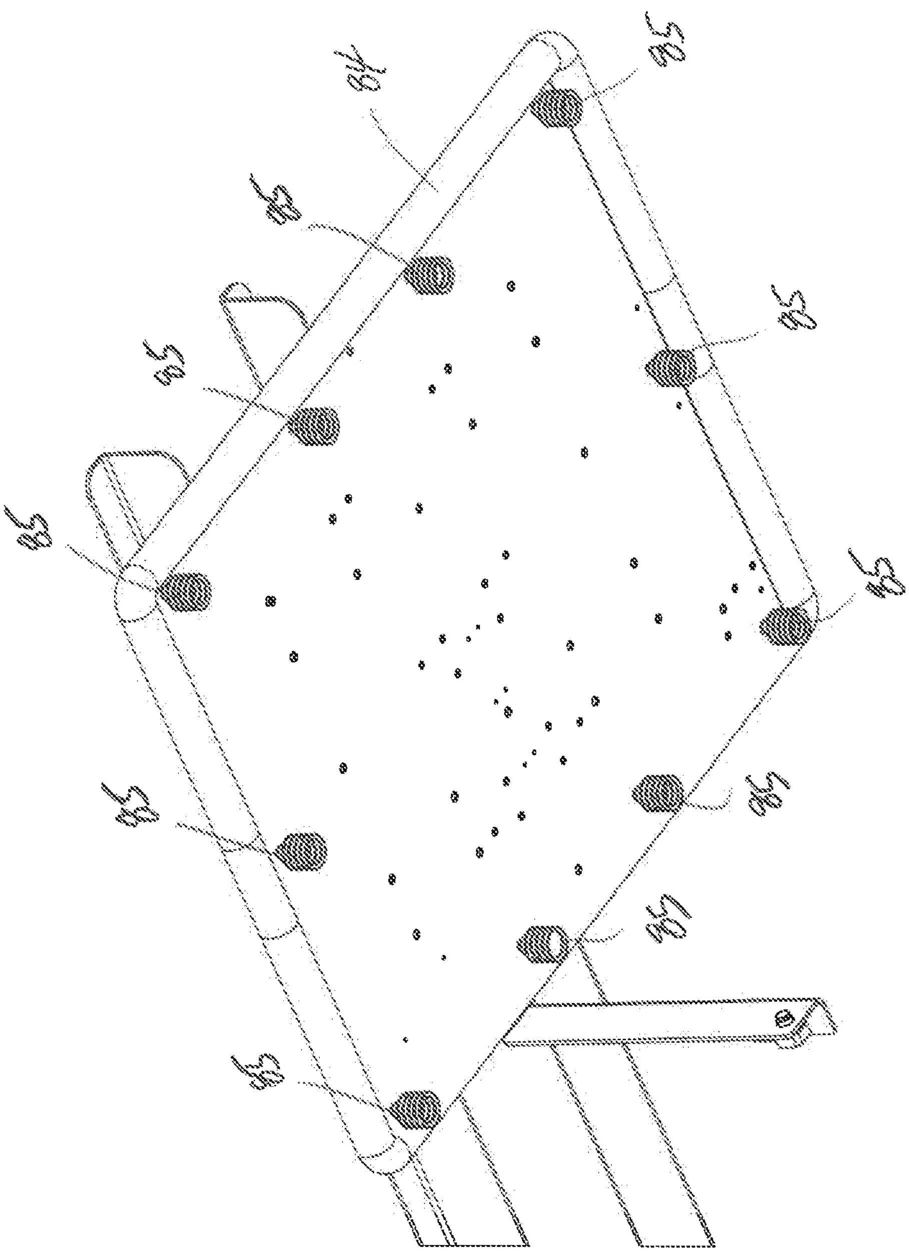
FIG. 16 is a perspective lower view of a stacker head, according to an example embodiment of the present disclosure.

The stacker 80 further includes an arm 83 extending from the elongated support 81 and supporting a stacker head 84 at a distal end thereof. The head 84 contains a plurality of suction grippers 85 for engaging slip sheets 50*c*. In one implementation, as shown in FIG. 16, the stacker head 84 includes 10 suction grippers 85 near a perimeter of the stacker head 84. This ensures that the stacker head 84 sufficiently engages with the slip sheet 50*c*. In other words, there is sufficient engagement of the slip sheet 50*c* caused via vacuum created by the suction grippers 85. It should be appreciated that more or less suction grippers can be employed depending on the characteristics and properties of the slip sheets.

In some implementations, the arm 83 of the stacker 80 can be further configured to move in a vertical direction (i.e., up-and-down) along the elongated support 81 in order to engage the slip sheet 50*c*. Some instances of the vertical movement include the function to retrieve the slip sheet 50*c* from the inspection area 61 of the table 60, place the slip sheet 50*c* into the stacking tray 76, or place the slip sheet 50*c* into the 'failed' stacked area 74.

While the example embodiments described herein relates to a rotary stacker, it should be understood that other types of stackers can be employed, such as, but not limited to, a linear stacker, a servo stacker, an electric stacker, a counterbalance stacker, a ride-on stacker, a manual stacker.

It is to be understood that the operation and movements of associated components of the stacker 80 is controlled by a microprocessor or control unit or controller 105 (FIG. 1), operating in a known manner, and is driven by any appropriate drive mechanism known in the art, and not limited to those disclosed in the exemplary embodiments herein. It should further be understood that the operation and movements of the stacker can be controlled by a separate microprocessor or control unit or controller besides controller 105.

Figure 17:
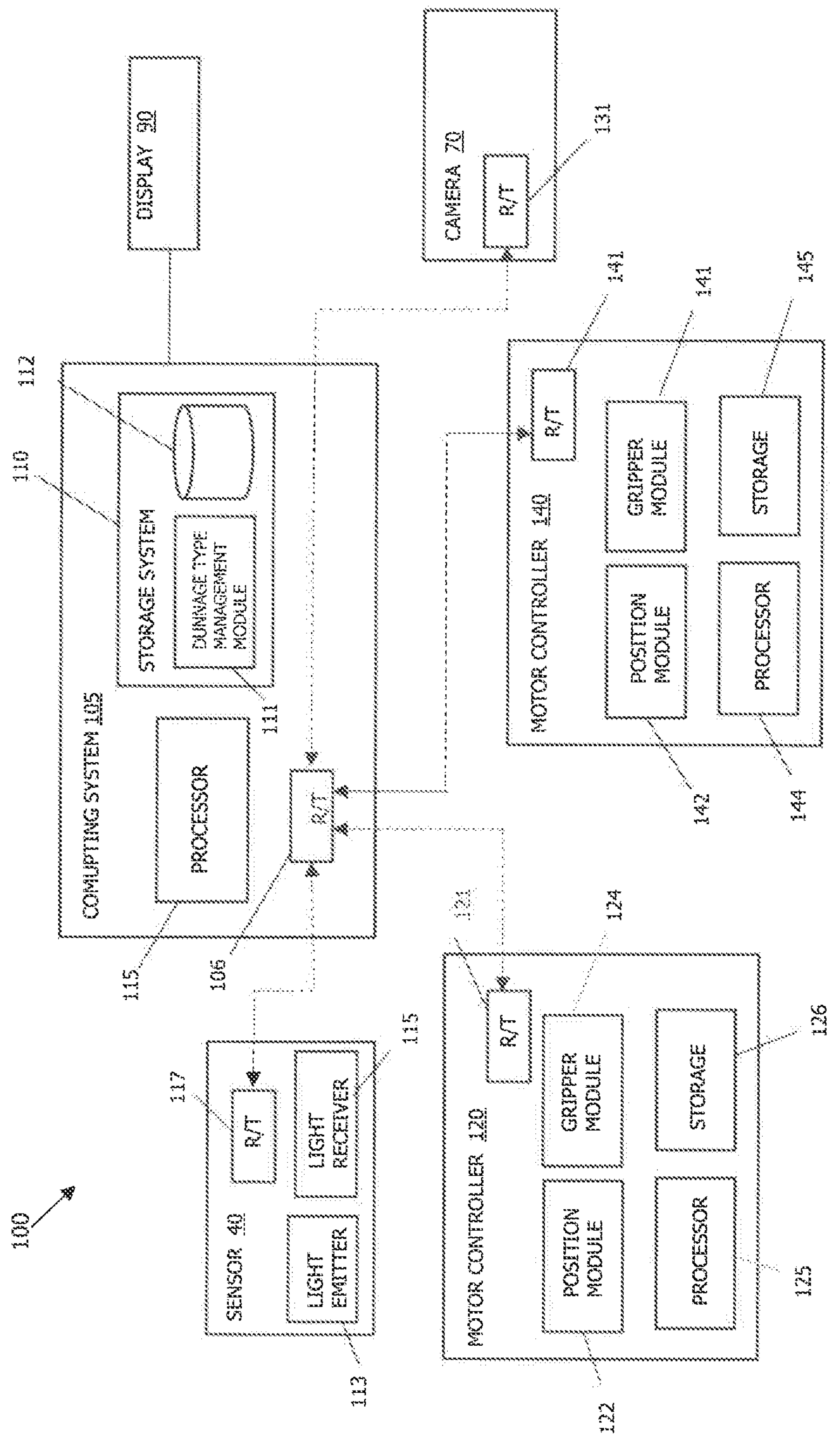
FIG. 17 is a schematic block diagram of a system for sorting dunnage, according to an example embodiment of the present disclosure.

FIG. 17 is a schematic representation of an exemplary dunnage management system 100, according to an example embodiment of the present disclosure. The dunnage management system 100 includes a computing system 105 in communication with a sensor 40, a motor controller 120 for robot 20, a camera 70, and/or a motor controller 140 for stacker 80. In one implementation, the computer system 105 receives information collected by the sensor 40, the motor controller 120, the camera 70, and/or the motor controller 140 via a receiver/transmitter 106. More specifically, the receiver/transmitter 106 is configured to receive information from a receiver/transmitter 117 of the sensor 40, a receiver/transmitter 121 of the motor controller 120, a receiver/transmitter 131 of the camera 70, and a receiver/transmitter 141 of the motor controller 140. The receiver/transmitters 106, 117, 121, 131, and 141 may communicate by any wireless communication protocols or means, such as Bluetooth, Wi-Fi, RF transmission, GPS, ZigBee, Z-Wave, or the like. In other implementations, the dunnage management system 100 may include only one receiver/transmitter to handle all communications between the sensor 40, the motor controller 120, the camera 70, and/or the motor controller 140. In other implementations, the computing system 105 may be hardwired to the sensor 40, the motor controller 120, the camera 70, and/or the motor controller 140. For example, the computing system 105 may be communicating over a serial connection (e.g., I2C interface) with the sensor 40, the motor controller 120, the camera 70, and/or the motor controller 140. In other implementations, the computing system 105 performs data processing and communicates information using a wireless communication protocol to a storage system. The storage system may be implemented as a single storage device, but may also be implemented across multiple storage devices or subsystems located at disparate locations and communicatively connected, such as in a cloud computing system.

The sensor 40 is configured to measure a distance to a surface of the dunnage for determining a type of dunnage. In one example, the sensor 40 is a photoelectric sensor (or a photoeye sensor) that detects a change in light intensity by using laser scanners to measure a depth of various points in an image with infrared light, for example. This depth can be associated as the measured distance, which can be measured from the sensor 40 to the surface of the dunnage. In one implementation, the sensor 40 can include a light emitter 113 that produces the light to bounce off a targeted item and returned to a light receiver 115. Based on a time difference, via a timer (not shown), between the emission of the light and its return to the light receiver 115 after being reflected by the targeted item, the sensor 40 is able to measure the distance between the surface of the dunnage and the sensor 40. For example, the controller 105, via the sensor 40, can determine that the dunnage is either a slip sheet in response to the sensor 40 detecting a constant time (i.e., constant surface), a top frame in response to the sensor 40 detecting a substantial timing deviation near an end of the dunnage, or a pallet in response to the sensor 40 detecting multiple timing deviations of the dunnage.

In other implementations, the sensor 40 can use travel-time to determine distance (or depth), such as, for example, time pulses or phase shift of an amplitude modulated wave. This measured distance is then communicated to the computing system 105 to be process, which will be described herein.

The camera 70 is configured to inspect the surface of a slip sheet 50*c*. When the camera 70 detects any anomalies or defects on the slip sheet 50*c*, the computing system 105 will provide instructions to transport the defected slip sheet to a 'failed' stacked area 74. Such defects can include chips, cracks, dents, wrinkles, punctures, tears, blisters, foreign inclusions, etc. on the slip sheet 50*c*. However, when the camera 70 does not detect any defects, the computing system 105 will provide instructions to transport the slip sheet to a slip sheet stacking tray 76.

The computing system 105 provides control instructions to be executed by the motor controller 120 which controls a motor(s) (not shown) for operating the robot 20, the robot head 30 and/or the grippers 31, 32, 33. The control instructions may be individually configured for each component. In one implementation, the control instructions provide instructions to a position module 122 and a gripper module 124 of the motor controller 120. For example, the position module 122 determines a position(s) of a rotary axis (e.g., 22) and a cantilevered arm (e.g., 23), creating a multi-axis robot with five axes of motion (i.e., an anthropomorphic robotic device). The position module 122 may also determine a position(s) of the robot head 30 for proper alignment above the stacked dunnage 50 and placement of the grabbed dunnage to its respective area. The gripper module 124 may determine which grippers (e.g., 31, 32, 33) to operate based on the determined type of dunnage and its position(s) thereof. For example, gripper module 124 controls and operates grippers 31 when a top frame 50*a* is determined, controls and operates grippers 32 when a pallet 50*b* is determined, and controls and operates grippers 33 when a slip sheet 50*c* is determined.

The motor controller 120 includes a processing system 125 and a storage 126. The storage 126 may house software, such as control software to execute control instructions for managing the movement system and/or the sensor 40. For example, the control functionality of the motor controller 120 may be programmable, such as programmable via the computing system 105. Control software stored in the storage 126 of the motor controller 120 is executable by the processor 126 in order to carry out certain aspects of the dunnage management methods and system controls described herein.

The computing system 105 further provides control instructions to be executed by the motor controller 140 which controls a motor(s) (not shown) for operating the rotary stacker 80. In one implementation, the control instructions provide instructions to a position module 142 to control movement of the rotary stacker 80 and a gripper module 143 of the motor controller 140. For instance, the position module 142 determines and operates a position(s) of a rotary arm 83 with respect to an elongated support 81. As an example, the position module 142 provides instructions to the rotary arm 83 to move in a vertical direction to engage the dunnage (i.e., slip sheet). The position module 142 also provides instructions to the rotary arm 83 to rotate in either direction to place the dunnage at its respective location. For example, the rotary arm is configured to rotates clockwise (e.g., 45 degrees) to transport the slip sheet to a failed' stacked area 74 or counter-clockwise (e.g., 45 degrees) to transport the slip sheet to the stacking tray 76. The gripper module 143 provides instructions to the grippers (e.g., 85) to engage the slip sheet and release the slip sheet.

The motor controller 140 includes a processing system 144 and a storage 145. The storage 145 may house software, such as control software to execute control instructions for managing the movement system and/or the camera 70. For example, the control functionality of the motor controller 140 may be programmable, such as programmable via the computing system 105. Control software stored in the storage 145 of the motor controller 140 is executable by the processor 144 in order to carry out certain aspects of the dunnage management methods and system controls described herein.

The computing system 105 includes a processor 115 and a storage system 110. The storage system 110 includes software, including a dunnage type management module 111, and stored data 112, including data in database structure. The processor 115 loads and executes software, including the dunnage type management module 111, which is a software application stored in the storage system 110. The processor 115 can also access data stored in the database 112 in order to carry out the methods and control instructions described herein. Although the computing system 105 is depicted in FIG. 17 as one, unitary system encapsulating one processor 115 and one storage system 110, it should be appreciated that one or more storage systems 110 and one or more processors 115, may comprise the computing system 105, which may be a cloud computing application and system. Similarly, while the dunnage type management module 111 is schematically depicted as a single software application contained on a single storage system 110, it is to be recognized that the dunnage type management module 111 may be implemented as various software instruction sets, or modules, stored at various locations, such as on various storage systems. The processor 115 includes a processor, which may be a microprocessor, a general-purpose central processing unit, an application-specific processor, a microcontroller, or any type of logic device. The processor 115 may also include circuitry for retrieving and executing software, including the dunnage type management module 111, from the storage system 110. The processor 115 may be implemented with a single processing device, but may also be distributed across multiple processing devices or subsystems that cooperate in executing software instructions.

The storage system 110, which stores database 112, may comprise any storage media, or group of storage media, readable by processor 115, and capable of storing software and data. The storage system 110 can include volatile and non-volatile, removable and non-removable media implemented in any method or technology for storage of information, such as computer-readable instructions, data structures, program modules, or other data. As described above, storage system 110 may be implemented as a single storage device, but may also be implemented across multiple storage devices or subsystems located at disparate locations and communicatively connected, such as in a cloud computing system. Examples of storage media include random access memory, read only memory, optical discs, flash memory, virtual memory, and non-virtual memory, or any other medium which can be used to store the desired information and may be accessed by a processor 115.

The dunnage type management module 111 operates to control and produce the functionality of the dunnage management system 100. For example, the dunnage type management module 111 determines where to place the dunnage based on the type of dunnage measured by the sensor 40 in conjunction with analyzing information about which grippers to use. Additionally, the dunnage type management module 111 may access control instructions to a movement system, as described herein, and may transmit such program instructions from receiver/transmitter 121 to the motor controller 120 and/or receiver/transmitter 141 to the motor controller 140 for execution. Additionally, the dunnage type management module 111 may determine when a scanning by the sensor 40 should occur. For example, the dunnage type management module 111 may instruct scanning the dunnage once a position of the stack of dunnage is determined. For example, the dunnage management system 100 may include the sensor 40 that measures a distance from an edge of the stack of dunnage to the robot 20.

The dunnage type management module 111 may further determine which gripper to operate for manipulating the dunnage based on the type of dunnage detected by the sensor 40. Depending on the type of detected dunnage (i.e., a top frame, a pallet, or a slip sheet), the dunnage type management module 111 determines which grippers to use for engaging the dunnage. For example, gripper module 124 controls and operates grippers 31 when a top frame **50*a* is determined, controls and operates grippers 32 when a pallet 50*b* is determined, and controls and operates grippers 33 when a slip sheet 50*c*** is determined.

Further, the computing system 105 includes a display device 150 in communication to display the information executed by the dunnage type management module 111. The display device 150 may be a display on a device, such as a computer monitor, a laptop, a television, a smart phone, etc.

Figure 18:
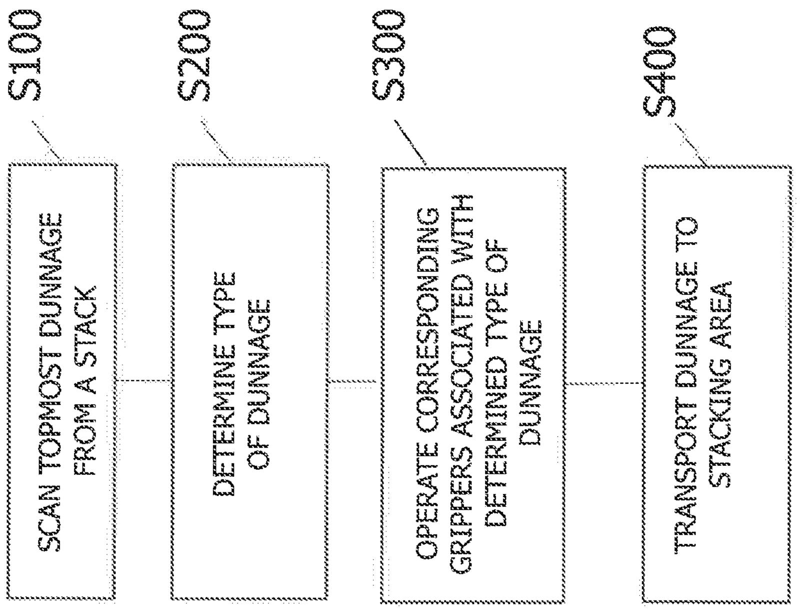
FIG. 18 is a flowchart illustrating a method of sorting dunnage, according to an example embodiment of the present disclosure.

FIG. 18 is a flowchart of a method of sorting a dunnage according to an example embodiment. These steps may be executed, for example, by the dunnage type management module 111, which may be on the computing system 105. In step S100, the sensor 40 scans the topmost dunnage from a stack of dunnage 50. In step S200, the sensor 40 determines a type of dunnage based on light intensity of a received light from the sensor 40. For example, when a constant light intensity is measured, the dunnage type management module 111 determines that the dunnage is a slip sheet. When at least one light intensity deviation is measured, the dunnage type management module 111 determines that the dunnage is a top frame. When at least more than two light intensity deviations are measured, the dunnage type management module 111 determines that the dunnage is a pallet. Once the type of dunnage is determined, the dunnage type management module 111 then provides instructions to the respective gripper assemblies (e.g., 31, 32, 33) to operate thereof (S300). For example, a first gripper assembly is configured to engage with a top frame, a second grippers assembly is configured to engage with a pallet, and a third gripper assembly is configured to engage with a slip sheet. Once the appropriate gripper assembly is selected and engages the dunnage, the dunnage type management module 111 provides instructions to transport the engaged dunnage to its appropriate predetermined collection area (S400). For example, the dunnage type management module 111 provides instructions to transport the dunnage to at least one of: a first collection area containing a plurality of stacked top frames, a second collection area containing a plurality of stacked pallets, or a third collection area containing a plurality of stacked slip sheets.

The aspects and embodiments of the invention can be used alone or in combinations with other systems and methods. For example, the aspects and embodiments of this invention can be added to a bulk palletizer, more specifically, to a back of the bulk palletizer. This enables operators to load a single stack of unsorted dunnage instead of loading in three sorted, organized stacks.

In the description of the present application, it is to be noted that terms such as "mounted", "joined", and "connected" are to be understood in a broad sense unless otherwise expressly specified and limited. For example, the term "connected" may refer to "securely connected" or "detachably connected"; may refer to "mechanically connected" or "electrically connected"; or may refer to "connected directly", "connected indirectly through an intermediary", or "connected in two components". For those of ordinary skill in the art, the specific meanings of the preceding terms in the present application may be understood based on specific situations.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for sorting dunnage of a depalletized loaded pallet, comprising:

a programmable robot including an arm for transferring a dunnage from a stacked dunnage of different types to a collection area, the programmable robot includes a rotatable head having a first gripper assembly for engaging with a first type of dunnage, a second gripper assembly for engaging with a second type of dunnage, and a third gripper assembly for engaging with a third type of dunnage, wherein the first gripper assembly, the second gripper assembly and the third gripper assembly are independently operated and configured to engage the respective dunnage based on the type of dunnage, wherein the rotatable head is configured to rotate in a first rotated position that supports the first gripper assembly to engage with the first type of dunnage, wherein the rotatable head is configured to rotate in a second rotated position that supports the second gripper assembly to engage with the second type of dunnage, and wherein the rotatable head is configured to rotate in a third rotated position that supports the third gripper assembly to engage with the third type of dunnage; and a sensor for determining the type of dunnage, wherein the sensor is configured to determine that the dunnage is:

a slip sheet in response to the sensor detecting a constant light intensity, a top frame in response to the sensor detecting a substantial drop of light intensity deviation near an end of the dunnage, or a pallet in response to the sensor detecting substantial multiple drops of light intensity of the dunnage.

2. The system of claim 1, wherein the first gripper assembly includes at least one pair of grippers that is configured to engage a short side portion of the top frame.

3. The system of claim 2, wherein the at least one pair of grippers includes a first jaw and a second jaw that cooperatively move towards each other to engage the top frame.

4. The system of claim 1, wherein the second gripper assembly includes at least one pair of end grippers that is configured to engage an opening in the pallet.

5. The system of claim 1, wherein the third gripper assembly is a plurality of suction grippers to engage the slip sheet.

6. A system for sorting dunnage of a depalletized loaded pallet, comprising:

a dunnage receiving table;

a programmable robot including an arm for transferring a dunnage based on a type of dunnage, the programmable robot includes a rotatable head that is configured to rotate in a first rotated position that supports a first gripper assembly to engage with a first type of dunnage, rotate in a second rotated position that supports a second gripper assembly to engage with a second type of dunnage, and rotate in a third rotated position that supports a third gripper assembly to engage with a third type of dunnage, wherein, in response to a dunnage of the first type, the programmable robot transfers the dunnage of the first type to a first collection area, wherein, in response to a dunnage of the second type, the programmable robot transfers the dunnage of the second type to a second collection area, and wherein, in response to a dunnage of the third type, the programmable robot transfers the dunnage of the third type to the dunnage receiving table;

a sensor for determining the type of dunnage, wherein the sensor is configured to determine that the dunnage is:

a slip sheet in response to the sensor detecting a constant light intensity, a top frame in response to the sensor detecting a substantial drop of light intensity deviation near an end of the dunnage, or a pallet in response to the sensor detecting substantial multiple drops of light intensity of the dunnage;

a conveyor for transporting the dunnage of the third type to an inspection area; and an inspection device for inspecting the dunnage of the third type for damage.

7. The system of claim 6, wherein the first collection area is a stack of top frames.

8. The system of claim 6, wherein the second collection area is a stack of pallets.

9. The system of claim 6, further comprising a stacker for engaging the dunnage of the third type from the inspection area of the dunnage receiving table to a third collection area or a fourth collection area.

10. The system of claim 9, wherein the third collection area is a stack of defected dunnage of the third type.

11. The system of claim 9, wherein the fourth collection area is a stack of non-defected dunnage of the third type.

12. The system of claim 11, wherein the inspection device is a camera.

13. A method of sorting dunnage of a depalletized loaded pallet, comprising:

scanning, via a sensor, a topmost dunnage from a stack of dunnage;

determining a type of dunnage based on a light intensity of a received light from the sensor, wherein a constant light intensity indicates a slip sheet, wherein at least one light intensity deviation indicates a top frame, wherein at least more than two light intensity deviations indicate a pallet, selectively operating a corresponding gripper assembly associated with the determined type of dunnage;

rotating the corresponding gripper assembly in a first rotated position to support a first gripper assembly to engage with a first type of dunnage;

rotating the corresponding gripper assembly in a second rotated position to support a second gripper assembly to engage with a second type of dunnage;

rotating the corresponding gripper assembly in a third rotated position to support a third gripper assembly to engage with a third type of dunnage; and transporting the dunnage to a predetermined stacking area.

14. The method of claim 13, wherein the gripper assembly includes a first gripper assembly configured to engage a slip sheet, a second gripper assembly configured to engage a top frame, and a third gripper assembly to engage a pallet.

15. The method of claim 13, wherein transporting the dunnage to a predetermined stacking area includes transporting to at least a first collection area containing a plurality of stacked top frames, a second collection area containing a plurality of stacked pallets, or a third collection area containing a plurality of stacked slip sheets.

* * * * *